US00RE42184E

(19) United States
(12) Reissued Patent
Bass et al.

(10) Patent Number: US RE42,184 E
(45) **Date of Reissued Patent: *Mar. 1, 2011**

(54) OPTICALLY WRITTEN DISPLAY

(75) Inventors: Michael Bass, Vero Beach, FL (US); Jason Eichenholz, Orlando, FL (US); Alexandra Rapaport, Hem (FR)

(73) Assignee: Research Foundation of the University of Central Florida, Inc., Orlando, FL (US)

( * ) Notice: This patent is subject to a terminal disclaimer.

(21) Appl. No.: 11/805,862

(22) Filed: May 23, 2007

Related U.S. Patent Documents

Reissue of:
(64) Patent No.: 6,897,999
Issued: May 24, 2005
Appl. No.: 10/329,920
Filed: Dec. 26, 2002

U.S. Applications:
(60) Continuation-in-part of application No. 09/976,921, filed on Oct. 12, 2001, now Pat. No. 6,501,590, which is a continuation-in-part of application No. 09/919,131, filed on Jul. 31, 2001, now Pat. No. 6,654,161, and a continuation-in-part of application No. 09/919,130, filed on Jul. 31, 2001, now Pat. No. 6,844,387, which is a division of application No. 09/448,657, filed on Nov. 24, 1999, now Pat. No. 6,327,074.
(60) Provisional application No. 60/342,578, filed on Dec. 26, 2001, and provisional application No. 60/109,837, filed on Nov. 25, 1998.

(51) Int. Cl.
*G02F 1/35* (2006.01)
*G02F 2/02* (2006.01)
*G11C 13/04* (2006.01)

(52) U.S. Cl. ..... 359/326; 365/151; 501/123; 501/126; 501/904

(58) Field of Classification Search ..... 359/326–332; 365/151; 372/6, 39–42; 501/40, 50, 64, 78, 501/101, 123, 126, 152, 900, 904–906
See application file for complete search history.

(56) References Cited

U.S. PATENT DOCUMENTS

| | | | |
|---|---|---|---|
| 4,448,547 | A | 5/1984 | Wickerheim |
| 4,791,415 | A | 12/1988 | Takahashi |
| 4,871,231 | A | 10/1989 | Garcia, Jr. |
| 4,978,888 | A | 12/1990 | Anandan et al. |
| 5,003,179 | A | 3/1991 | Pollack |
| 5,051,278 | A | 9/1991 | Paz-Pujalt |
| 5,142,388 | A | 8/1992 | Watanabe |
| 5,154,962 | A | 10/1992 | Mertens et al. |
| 5,184,114 | A | 2/1993 | Brown |
| 5,192,946 | A | 3/1993 | Thompson et al. |
| 5,245,623 | A | 9/1993 | McFarlane |
| 5,317,348 | A | 5/1994 | Knize |
| 5,359,345 | A | 10/1994 | Hunter |
| 5,583,393 | A | 12/1996 | Jones |
| 5,622,807 | A | 4/1997 | Cutler et al. |

(Continued)

OTHER PUBLICATIONS

Kaminskii, Alexander A.; Laser Crystals, *Springer Series in Optical Sciences,* v. 14, 1981, pp. 170–311.

*Primary Examiner*—Hemang Sanghavi
(74) *Attorney, Agent, or Firm*—Woodcock Washburn LLP

(57) ABSTRACT

Two, three dimensional color displays having uniform dispersion of red, green and blue visible light emitting micron particles. Pumping at approximately 976 nm can generate green and red colors having an approximately 4% limit efficiency. One source can generate three colors with approximately limit efficiency. Modulators, scanners and lens can move and focus laser beams to different pixels forming two dimensional color images. Displays can be formed from near infrared source beams that are simultaneously split and modulated with micro electro mechanical systems, spatial light modulators, liquid crystal displays, digital micromirrors, digital light projectors, grating light valves, liquid crystal silicon devices, polysilicon LCDs, electron beam written SLMs, and electrically switchable bragg gratings. Pixels containing: Yb,Tm:YLF can emit blue light, Yb,Er(NYF) can emit green light, and Yb,Er:KYF and Yb,Ef:$YF_3$ can emit red light.

32 Claims, 20 Drawing Sheets

300

U.S. PATENT DOCUMENTS

| | | | |
|---|---|---|---|
| 5,684,621 | A | 11/1997 | Downing |
| 5,724,062 | A | 3/1998 | Hunter |
| 5,746,942 | A | 5/1998 | Bowman et al. |
| 5,764,403 | A | 6/1998 | Downing |
| 5,786,102 | A | 7/1998 | Paz-Pujalt et al. |
| 5,801,792 | A | 9/1998 | Smith et al. |
| 5,846,684 | A | 12/1998 | Paz-Pujalt et al. |
| 5,914,807 | A | 6/1999 | Downing |
| 5,943,160 | A | 8/1999 | Downing |
| 5,956,172 | A | 9/1999 | Downing |
| 5,985,990 | A | 11/1999 | Kantner et al. |
| 5,989,799 | A | 11/1999 | Verbeeck et al. |
| 6,028,977 | A | 2/2000 | Newsome |
| 6,061,179 | A | 5/2000 | Inoguchi et al. |
| 6,117,529 | A | 9/2000 | Leising et al. |
| 6,128,131 | A | 10/2000 | Tang |
| 6,276,801 | B1 | 8/2001 | Fielding |
| 6,327,074 | B1 | 12/2001 | Bass et al. |
| 6,501,590 | B2 | 12/2002 | Bass et al. |
| 6,654,161 | B2 | 11/2003 | Bass et al. |
| 6,844,387 | B2 | 1/2005 | Bass et al.. |
| 6,897,999 | B1 | 5/2005 | Bass et al. |
| 7,075,707 | B1 | 7/2006 | Rapaport et al. |
| 7,101,061 | B2 | 9/2006 | Nagai et al. |

300

400B

GREEN

RED

BLUE

*Red*

*Blue*

*Blue*

OPTICALLY WRITTEN DISPLAY

Matter enclosed in heavy brackets [ ] appears in the original patent but forms no part of this reissue specification; matter printed in italics indicates the additions made by reissue.

This invention claims the benefit of priority to U.S. Provisional Application 60/342,578 filed Dec. 26, 2001, and this invention is a Continuation-In-Part of U.S. application Ser. No. 09/976,921 filed Oct. 12, 2001 now U.S. Pat. No. 6,501, 590, which is a Divisional Application of U.S. application Ser. No. 09/448,657 filed Nov. 24, 1999, now U.S. Pat. No. 6,327,074, which claims priority to U.S. Provisional Application 60/109,837 filed by the same subject inventors and assignee as the subject invention on Nov. 25, 1998, and this invention is a Continuation-In-Part of U.S. application Ser. No. 09/919,131 filed Jul. 31, 2001 now U.S. Pat. No. 6,654, 161, and U.S. application Ser. No. 09/919,130 filed Jul. 31, 2001 now U.S. Pat. No. 6,844,387, and this invention was partially funded under U.S. Army Contract DAAD199910220.

FIELD OF INVENTION

This invention relates to displays, and in particular to methods and apparatus for forming an optically written projection display encompassing two dimensional single, dual color and three coloured, green and blue) color displays that uses near infrared laser beams that are simultaneously split and modulated and directed at particles in display mediums, wherein the emitted colors have high limit efficiencies.

BACKGROUND AND PRIOR ART

Two dimensional and three dimensional displays are well known to be made monochromatic displays. However, monochromatic does not offer the detail such as shown using red, green and blue colors.

Displays using liquid crystals have been proposed of generating color displays. See for example, U.S. Pat. Nos. 5,359,345 and 5,724,062 to Hunter. However, these patents require arranging individual pixels in rows and corresponding columns, column 4, lines 36–39. The devices described can be expensive and complicated to manufacture, can have a narrow angular view ranges with low brightness.

Additional display systems have been proposed with similar problems to those described above. See for example, U.S. Pat. No. 4,791,415 to Takahashi; U.S. Pat. No. 4,871,231 to Garcia, Jr.; U.S. Pat. No. 5,184,114 to Brown; U.S. Pat. No. 5,192,946 to Thompson et al.; and U.S. Pat. No. 5,317,348 to Knize.

Several patents have been proposed for panel displays using two-frequency upconversion fluorescence. See for example, U.S. Pat. Nos. 5,684,621; 5,764,403; 5,914,807; 5,943,160; and 5,956,172 all to Downing. The Downing '403 patent appears to be the most relevant to the subject invention. Downing '403 is primarily concerned with embodiments where the use different layers for red, green and blue emitters, abstract, FIG. 6, and briefly describes some mixing of only crystal type materials in a single display media. However, for the single display media, Downing '403 uses nanometer sized particles, column 4, lines 33+, column 9, lines 42–45, which would inherently be difficult to form, handle and disperse in a display medium.

SUMMARY OF THE INVENTION

The first objective of the present invention is to provide an inexpensive methods and systems for forming two dimensional and three dimensional displays.

The second object of this invention is to provide methods and systems for uniformly dispersing micron sized particles in a transparent host media for two and three dimensional displays.

The third object of this invention is to provide a two and three dimensional display media methods and systems using dye doped plastics uniformly dispersed in a plastic transparent host media.

The fourth object of this invention is to provide for optically written projection display methods and systems that can directly write an entire image at one time without having to form an image one pixel at a time or one line at a time.

The fifth object of this invention is to provide methods and systems for creating large screen direct view displays such as movie screen, television screen, HDTV(high definition television) and computer monitor displays, using rare earth doped crystals.

The sixth object of this invention is to provide methods and systems for projecting near IR(infrared) laser light to a display using single devices that include both modulators and scanners.

The seventh object of this invention is to provide a single laser source such as a laser diode to efficiently excite two colors with the same pump wavelength.

The eigth object of this invention is to provide a single laser source such as a laser diode to efficiently excite three colors with the same pump wavelength.

The invention covers uniformly dispersing particles of approximately 0.5 microns to approximately 50 microns in appropriate places in a transparent host display medium. The appropriate places are the locations of the pixels that will produce the desired color emission when illuminated by the corresponding exciting laser. The particles can be dye doped plastics, rare earth doped crystals, and the like, in display mediums such as plastic, acrylic plastic, and glass. The first preferred embodiment includes up to three lasers each emitting a laser beam at a different wavelength elected to excite specific groups of particles in the laser beam illuminated areas of the display medium. There are three different particulate types, with selected amounts of each uniformly dispersed in the appropriate places *in* the display medium. One particle type when excited by a first laser beam emits a red visible fluorescence, a second particle type when excited by the second laser beam emits a green visible fluorescence, and a third particle type when excited by the third laser beam emits a blue visible fluorescence. The two dimensional display does not require a matched index of refraction between the particles and the display medium.

A second embodiment is for a three dimensional display having up to six laser beams, each being emitted at a different wavelength. Similar to the first embodiment, the display medium has a substantially uniform dispersement of red, green and blue particles therethrough. A pair of laser beams is directed so that the beams intersect at a specific location in the display medium. One pair of intersecting beams that excites a first particle type that then emits red fluorescence, another intersecting pair with a second particulate type emits green fluorescence, and a third pair of intersecting beams with a third particulate type emits blue fluorescence. The three dimensional display requires a matched index of refraction between the particles and the display medium.

Optically written projection display(OWPD) embodiments are also disclosed, which can be more efficient electrically and cost less to manufacture than CRT(cathode ray terminals) and conventional projection televisions, by using novel combinations with scanners and modulators allowing for the simultaneous splitting and modulating of generated beams in addition to designs employing electro-optic and acousto optic modulators and scanners, The additional modifications allow for applications for high end projection televisions such as HDTV(high definition television) and movie screen applications that do not use raster type scanning techniques.

The display mediums for OWPD can include transmissive displays where light is directed through panels which either block or transmit incoming light to create an image. Additionally, the display medium can be a reflective display where light is reflected of a surface such as a mirror, and the like. This light is then imaged and projected onto the viewing screen. In reflective projectors, the television image is formed by driving a small, pixilated, reflective chip such as the Texas Instruments Digital Light Projector(DLP) with a selected electrical input from the video signal. The viewed image can be formed by reflection off the chip, and through a projection lens to the display screen. The light can be modulated when the light hits regions of the mirror in the "on" state and reflects off of the mirror and through the projection lens to the screen. When the light hits regions of the mirror in the "off" state, the mirror will reflect the light away from the screen to an absorber.

The novel OWPD embodiments can include splitting and modulating devices that include: spatial light modulators (SLMs), micro electro mechanical systems(MEMS), liquid crystal displays(LCDs), digital micromirror devices (DMDs), digital light projectors(DLPs), grating light valves (GLVs), liquid crystal on silicon(LCOS) devices, polysilicon LCDs, ferro electric crystals(FECs), electron beam written spatial light modulators(E-beam SLMs), and electrically switchable Bragg gratings(ESBGs).

The light sources for the optically written projection displays can be a single laser diode for monochromatic displays, and can include up to three diodes for displays of red, green, and blue. The displayed image can be formed from reflecting three laser sources each having different wavelengths off the modulator,(or through it in a transmissive modulator), to each of the three different types of particles in the display medium. Infrared light can be absorbed by the particles in the pixels in the display. The particles in the pixels become excited and can emit visible radiation. Specifically, blue light can be efficiently generated by Yb,Tm:YLF(yttrium lithium fluoride) when pumped with diode laser light having a wavelength of approximately 958 to approximately 959 nm, green visible light can be efficiently generated by Yb,Er:NYF(sodium yttrium fluoride) when pumped with diode laser light having a wavelength of approximately 976 nm, and red visible light can be efficiently generated by Yb,Er:KYF(potassium yttrium fluoride) or Yb, Ef:$YF_3$ when pumped with diode laser light having a wavelength of approximately 973.5 nm to approximately 976 nm.

Single laser sources operating at one wavelength can generate at least one color(for example, Red) having a limit efficiency of at least approximately 7%. A single laser source pumping at approximately 976 nm can cause Green and Red color emissions having a limit efficiency of at least approximately 4%, or three color(Green, Red, Blue) emissions having a limit efficiency of at least approximately 2%.

Further objects and advantages of this invention will be apparent from the following detailed descriptions of a presently preferred embodiments that are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Below described FIGS. 1A–7 are described in detail in U.S. application Ser. No. 09/976,921 filed Oct. 12, 2001 which is a Divisional Application of U.S. application Ser. No. 09/448,657 filed Nov. 24, 1999, which claims priority to U.S. Provisional Application 60/109,837 filed by the same subject inventors and assignee as the subject invention on Nov. 25, 1998, both of which are incorporated by reference and which are further described below. Additionally, this invention is a Continuation-In-Part of U.S. application Ser. No. 09/919,131 filed Jul. 31, 2001, and U.S. application Ser. No. 09/919,130 filed Jul. 31, 2001, by the same assignee as the subject invention that is also incorporated by reference.

Figure 1A:
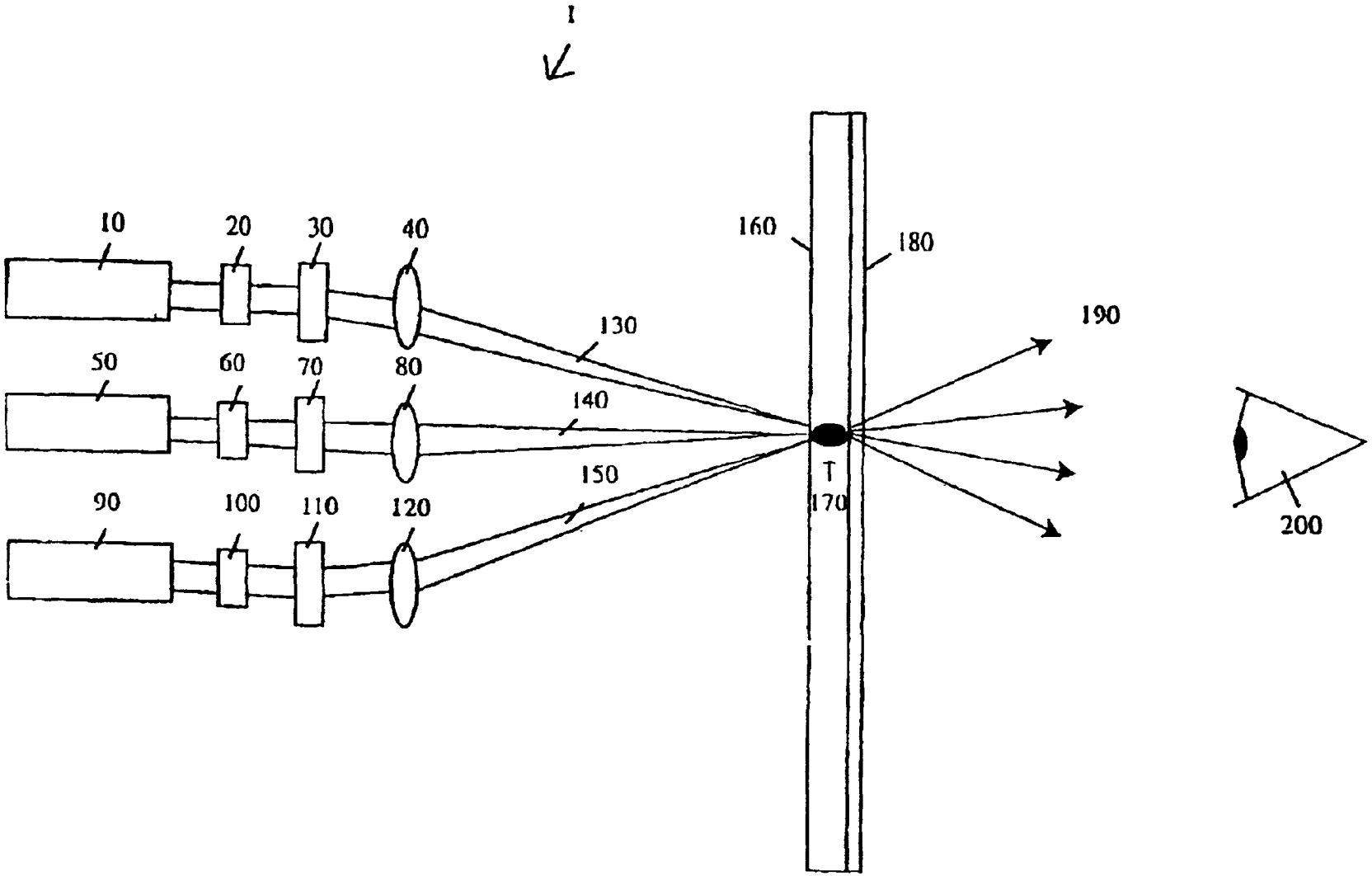
FIG. 1A illustrates a two dimensional display of the subject invention using three lasers.
Figure 1B:
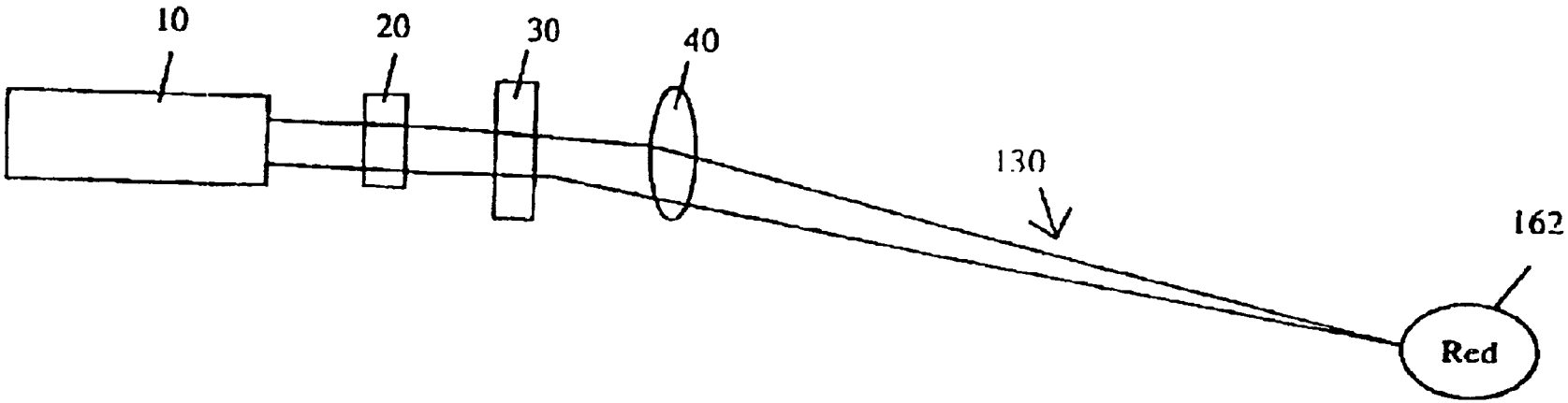
FIG. 1B shows a single light source and beam management system of FIG. 1A.

FIG. 1A illustrates a two dimensional display 1 of the subject invention using three lasers. FIG. 1B shows a single light source and beam management system of FIG. 1A. Referring to FIGS. 1A–1B, lasers 10, 50 and 90 can be diode lasers such as those manufactured by JDS Uniphase, Spectra Diode Co., OptoPower, Spectra-Physics and Coherent Co. Laser 10 emits a wavelength λ1 that excites red emitter particles. Laser 50 emits a wavelength λ2 that excites green emitter particles. Laser 90 emits a wavelength λ3 that excites blue emitter particles.

Modulators 20, 60 and 100 can be electro optic modulators by Lasermetrics, Co., an acousto-optic modulator by Newport Electro Optical Systems, or a direct drive to the power supply of the diode laser that can modulate the current to the laser diode and therefore modulate the laser power. The modulators 20, 60 and 100 control the intensity(power) or on and off states of the light emitted from lasers 10, 50, 90, respectively.

Scanners 30, 70 and 110 are used to control the direction of the light from the laser sources 10, 50, 90 to be incident at any location in the display medium 170. Scanners 30, 70 and 110 can be chosen from rotating mirrors, galvanometer mounted mirrors such as those sold by Cambridge Technology, rotating prism scanner sold by Speed Ring Co. or MEMs based scanner such as those sold by Analog Devices, Microvision, and the like. Alternatively, Scanners 30, 70 and 110 can be acousto-optic scanners manufactured by Newport Electro Optical Systems, a Binary, liquid crystal based scanners, and the like.

Optics 40, 80 and 120 are optics such as lens, and the like, that can focus the laser light into the specific location within the display medium 170. Optics can help achieve the selected display resolution(e.g., number of resolvable display points per unit length along either the height or width of the display).

130, 140 and 150 refer to the modulated, scanned and focused beams of light from their respective laser source, modulator, scanner and optics that are directed towards selected locations in display medium 160.

Display medium 160(shown and described in greater detail in reference to FIG. 2) has a thickness that is substantially thinner than its height or width with particles of materials that can emit red, green and blue visible light when excited by light from lasers 10, 50 and 90. Particles of materials can emit red, green, and blue visible light by either one or two photon absorption excitation distributed substantially uniformly throughout a passive host medium. 170 refers to a selected region in display medium 160 that is excited by light from any or all of the lasers 10, 50 and 90 to emit, red, green and blue light, and any combinations thereof. All red, green and blue particles are intermixed together in each of the pixels that make up the display medium, so that an individual pixel contains many red, green and blue emitting particles. Light from one of the lasers is directed to individual pixels, so that the light excites whatever specific color emitting particles are located in that pixel. For example, if the laser light is for red emissions, whatever red emitting particles that are located in that pixel are excited. Filter 180 can be a filter material manufactured by Schott Industries. The filter material absorbs light 130, 140 and 150 and transmits the visible emitted light 190. As filter material filter 180 blocks out or reflects light from lasers 10, 50 and 90 from reaching observer 200. Alternatively, filter 180 can be a thin film reflector manufactured by VLOC or CVI that reflects laser light 130, 140, and 150 and transmits the visible emitted light 190.

Figure 2:
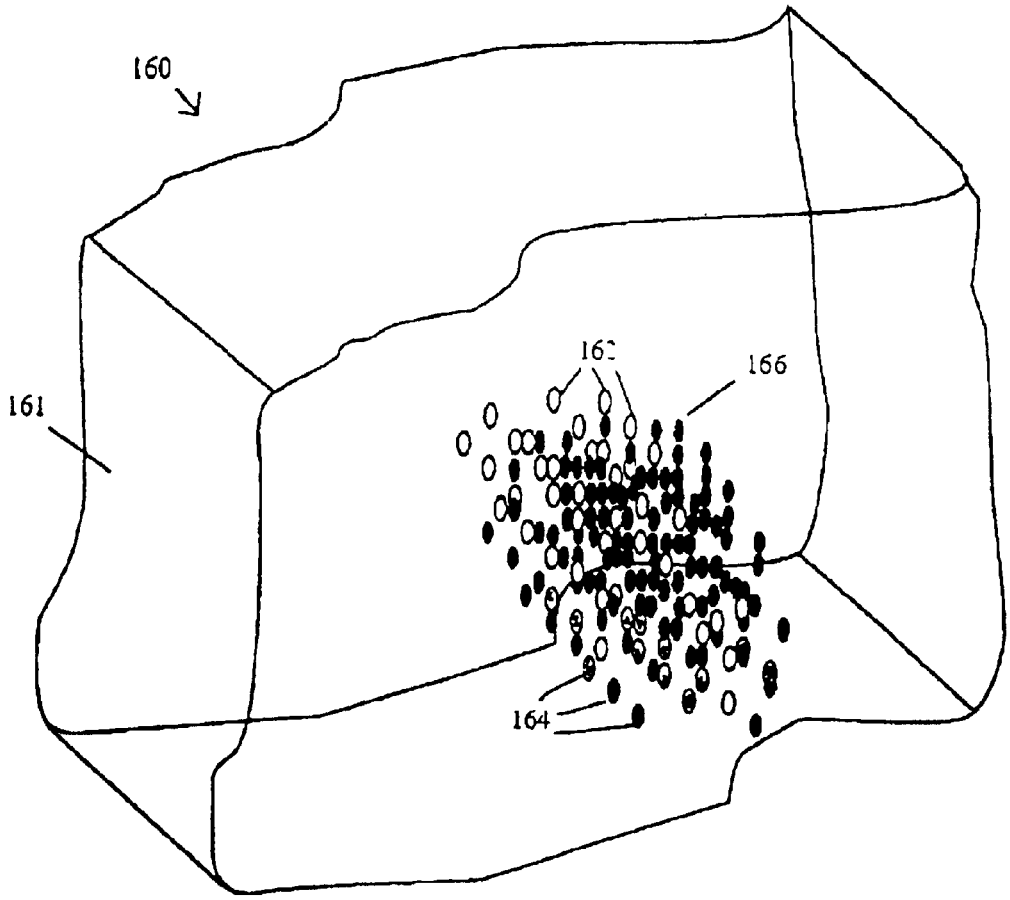
FIG. 2 shows a display media of FIGS. 1A–1B for producing three colors in two dimensions.

FIG. 2 shows a display medium 160 of FIGS. 1A–1B for producing three colors in two dimensions. Display medium 160 contains a substantially uniform distribution of three different types of particles that can emit visible light when excited by either one or two photon absorption. Particles 162 are selected to emit red visible light. Particles 164 are selected to emit green visible light and Particles 166 are selected to emit blue visible light. Thus, by selectively exciting only one type of particles to emit, one can obtain color from the display 160. Selectivity in excitation is achieved by selecting emitting particles that can be excited by different wavelengths of incident light. Thus, light source 10 excites the red emitters from particles 162, light source 50 excites the green emitters from particles 164 and light source 90 excites the blue emitters from particles 168.

A preferred embodiment of one of the most inexpensive materials to manufacturer and produce for the particles 162, 164, 166 are dye doped plastics, such as dye doped plastic polymethylmethacrylate(pmma). The dyes can be colored dyes such as rhodmaine B, and rhodaime 6G, and the like. Table 1 which will be described later gives examples of dyes.

Alternative particles 162, 164, 166 that are not as inexpensive to manufacture and produce as dye doped pmma include rare earth doped crystals, transition metal doped crystals, rare earth doped glasses, combinations thereof, and the like.

Rare earth doped crystals offer the most efficient two photon up converters. In particular the host crystal sodium yttrium fluoride(NaYF4) doped with rare earth family emitting ions has been tested by the subject inventors. For example, doping the host crystal with Er(erbium) can produce green, doping the host crystal with Tm(thulium) can produce blue, doping with Ho(holmium) can produce either or both red and green, and doping with Pr(praesodymium) can produce red, green, &/Or blue emissions. Adding co-dopant such as Yb(ytterbium) to the doped crystals can be done to improve the efficiency. Next the host crystal containing the emitting ions(doped rare earth materials) is placed into a liquid state of pmma and thoroughly mixed into the pmma until the particles are substantially uniformly mixed throughout the pmma.

The Particles 162, 164, 166 can be conventionally ground up and sieved. The novel sized particles are individually sized in the range of approximately 0.5 microns to approximately 50 microns. This sizing is to maximize absorption of pump light and consequently, the emission.

The display medium 161 is transparent and can be formed from materials such as pmma, acrylic plastic, epoxy, glass, and the like. The overall size of the display medium can range from less than 1 centimeters square to a few meters square or more. The particles 162, 164 and 166 are mixed in the display medium 161 while the latter is in a liquid type state, until the particles are substantially uniformly dispersed throughout the display medium 161, which later hardens over time. All the particles 162, 164 and 166 can be of uniform size within the range of approximately 0.5 microns to approximately 50 microns when the display medium 161 applications call for uniform emissions of red, green and blue. Additionally, each of the particles 162, 164 and 166 can be variably sized within the range of approximately 0.5 microns to approximately 50 microns as would be needed for specific applications where more of one color is needed for the display itself.

The entire display volume 161 can contain particles 162, 164, 166 that make up between the ranges of approximately 1/10% to approximately 99.9% of the overall volume of the display medium 161.

Each pixel is sized to contain selected amounts of particles 162, 164, and 166. For example, if a pixel is considered to have a diameter of D, and if the number of particles is n, then the dimension of each particle is less than or equal to D divided by the square root of n. The area of a single particle would be equal to D squared divided by n. For a pixel having a diameter of 500 microns by 500 microns, and the display is 1 micron thick, the pixel area would be 25,000 microns and if each particle size were approximately 1 micron by 1 micron, there could be as many as approximately 25,000 particles. Where an embodiment of the display would have substantially equal numbers of red, green and blue emitters there would be approximately 8333 particles of each type. The example, changes if the display &/or the particle size &/or the pixel size changes.

For a 2 dimensional display all the pixels must contain a substantially equal number and distribution of particles 162, 164, 166 throughout the display.

A two dimensional display using the subject invention does not have to have a matching index between the particles 162, 164, 166 and the display medium 161 itself. For a matching index between the display medium 161 and the particles 162, 164, 166, visible light can be observed from both sides of the display medium 161. Such a display would be substantially transparent to other light from other sources that the viewer would want to see. If there is an unmatched index between the display medium 161 and the particles 162, 164, 166, visible light to the observer 200 would appear to be scattered.

Thus, for a two dimensional display having a matching index, the particles 162, 164, 166 can be dye doped pmma and the display medium 161 can be pmma. Additionally, for a two dimensional display having an unmatching index, the particles 162, 164, 166 can be dye doped pmma, and the display medium 161 can be formed from glass.

Figure 3:
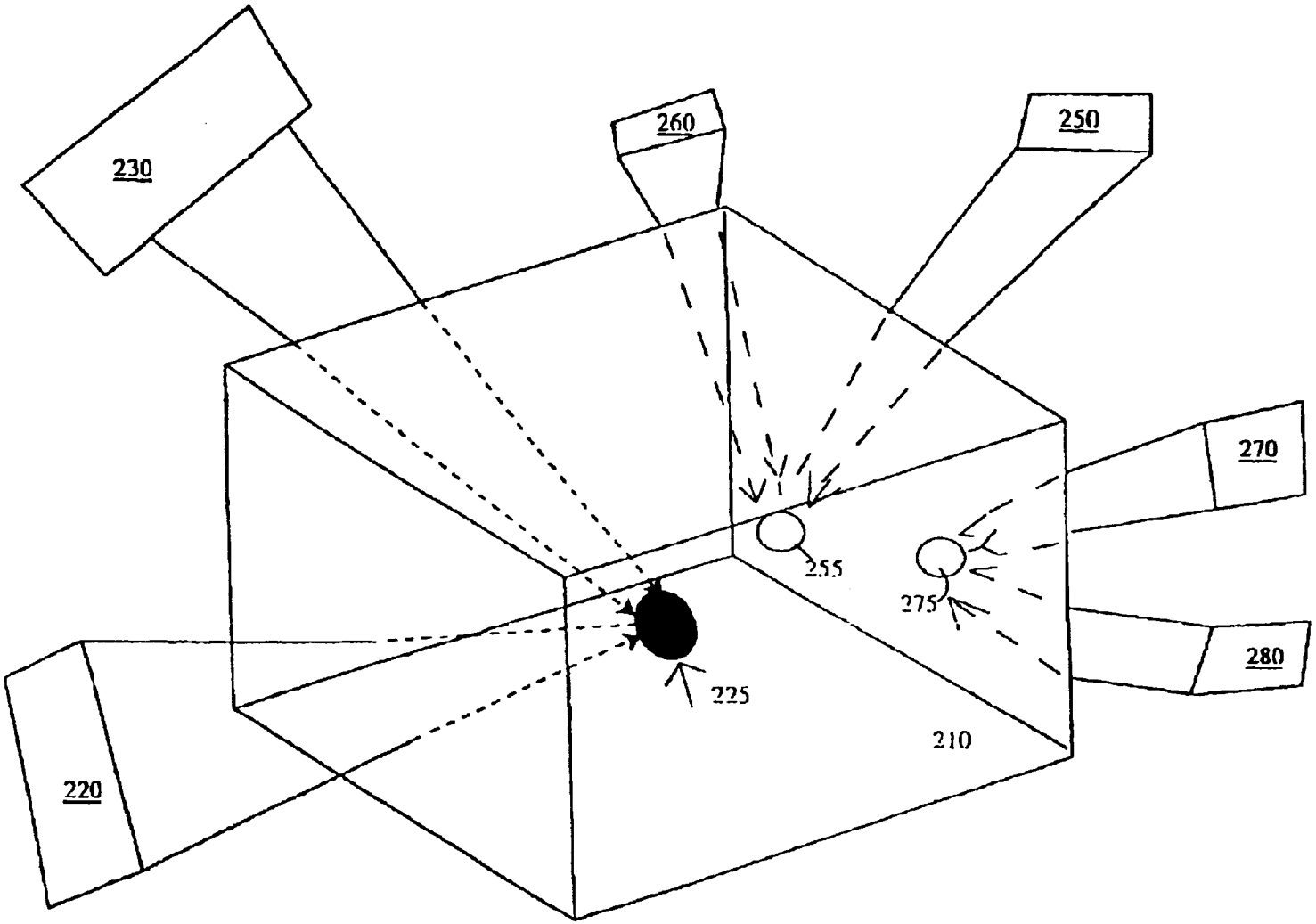
FIG. 3 shows a display media for producing three colors in three dimensions.

FIG. 3 shows a display for producing three colors in three dimensions. Referring to FIG. 3, display medium 210 can be formed from material similar to that described in reference to display medium 170 above. For a three dimensional display, medium 210 can be formed into an object having a shape such as a cube, a cylinder, rectangular parallelepiped. The overall size of the display medium 210 can range from approximately a few cubic centimeters to approximately several cubic meters, and more. For three dimensional displays, an intersection of two different wavelengths is needed to excite visible fluorescent light. 220 and 230 refer to beams of light each being emitted at different wavelengths of near infrared or infrared light. Beam 220 can originate from components 10–40, and beam 230 can originate from components 50–80 as described in reference to FIGS. 1A–1B. For purposes of this example, volume element (voxel) 225 is chosen to emit red visible light only when beams 230 and 220 intersect together and excite the red emitters present in voxel 225, and not the green emitters and not the blue emitters. Thus, the point of intersection of 220 and 230 will emit red visible light. The modulators 20, 60, scanners 30, 70 and optics 40, 80 move the beams 220, 230 intersection point to any point in the volume of the display medium 210. In this manner the intersection point traces out a three dimensional image. 260 and 250 refer to two other different wavelength light beams that intersect at voxel 255 that can excite the green emitters, and different wavelength light beams 270 and 280 can intersect at voxel 275 to excite the blue emitters. Each of the different wavelength light beams 220, 230, 250, 260, 270, 280 can originate from different laser sources similar to those previously described.

Unlike the two dimensional displays, for a three dimensional display there must be substantial index matching between the transparent host display medium material and the particles because for a three dimensional display the observer must be able to see into the three dimensional display from all angles. Thus, dye doped plastic pmma particles substantially uniformly dispersed in a pmma display medium would work for a three dimensional display. However, dye doped plastic pmma particles inside a lead glass display medium would not work for three dimensional displays since dye doped plastic pmma particles have a low index of refraction while the lead glass has a high index of refraction.

Three dimensional display media sizes can range from small sizes of approximately 5.0 cm on a side, to medium sizes of approximately 25 cm on a side, to large of approximately 1 meter on a side.

For a display media of approximately 25 cm on a side, and 500 voxels in each linear dimension a voxel can be approximately 500 micrometers in diameter. If the crystallites are approximately 10 micrometers in diameter and doped to approximately 1% of the volume then there will be approximately 400 each of red, green and blue emitters per voxel.

Figure 4:
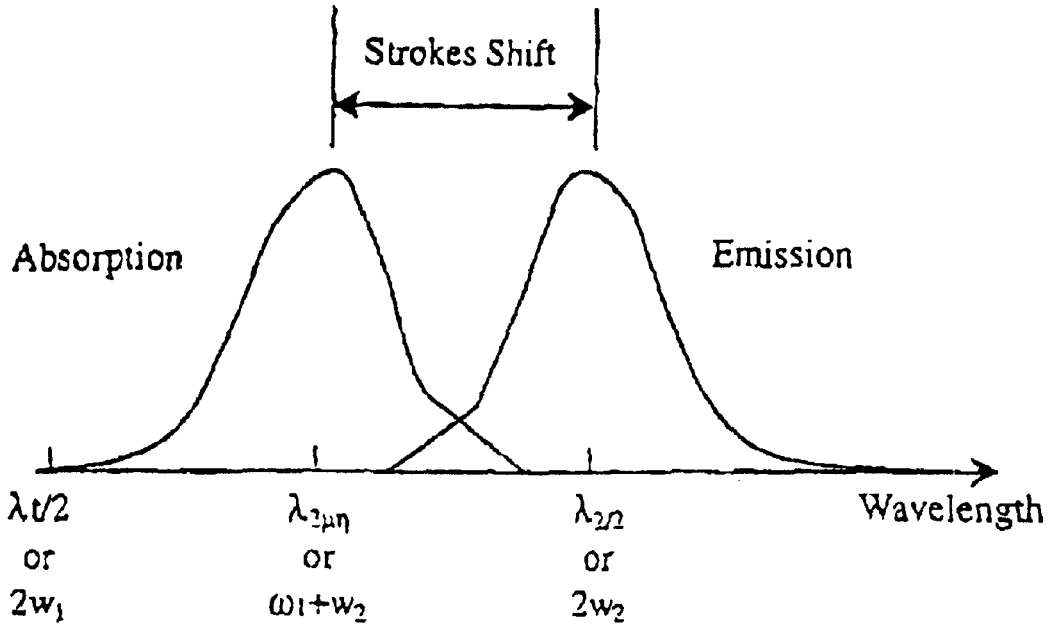
FIG. 4 is a plot of the absorption and emission spectra of a dye solution vs. wavelength.
Figure 5:
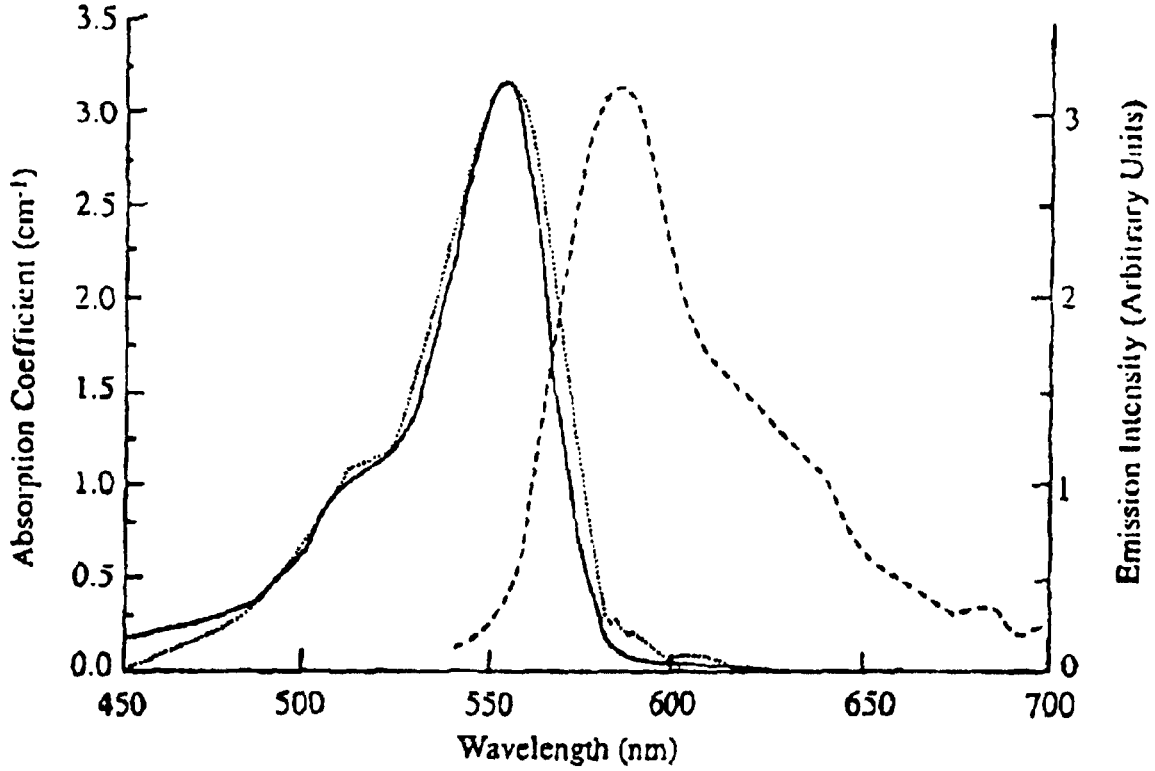
FIG. 5 is an absorption, excitation, and emission spectrum of a solution in methanol.

Experimentation was conducted and will now be described. FIG. 4 is useful in understanding the model for two-photon absorption using two different frequency (wavelength) light sources in an idealized dye solution. Two-photon absorption will take place if the energy of the two photons corresponds to an energy absorbed by the dye. In FIG. 4, the infrared sources are chosen so that twice the frequency of neither source lies in the dye solution's absorption band but that the sum of the frequency of light from each sources does. Since most dye solutions efficiently fluoresce upon absorbing light, wherever the appropriate two different frequency photons are simultaneously present there will be light emission from the excited volume. Linear absorption spectra was measured using a dual-beam spectrophotometer (Perkin-Elmer 330) for both liquid solutions and dye-doped polymers. Excitation spectra were measured using a two double-grating monochomator configuration. Emission spectra were recorded using one double-grating monochromator. The results of such measurements for a solution of $1\times10^{-5}$ M pyrromethene in methanol are given in FIG. 5.

Two-photon absorption experiments were performed using either a Q-switched neodymium-doped yttrium aluminum garnet ($Nd^{3+}$: YAG) laser, or a Q-switched chromium-doped lithium strontium aluminum fluoride ($Cr^{3+}$: LiSAF) laser, or both depending on the peak absorption wavelength of the dye studied. Visible emission was detected through a monochromator by a type I photomultiplier. The pump pulses were monitored by fast PIN photo-diodes having approximately 0.5 ns response times.

Figure 6A:
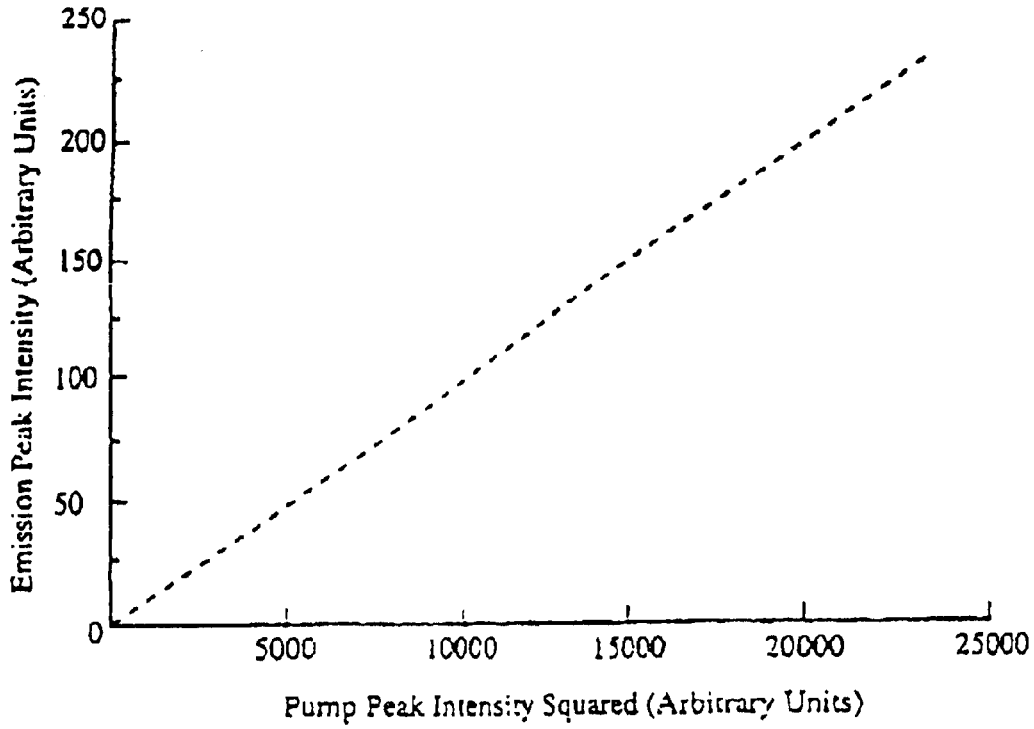
FIG. 6A is a visible emission peak intensity vs. the square of the pump peak intensity in a solution of rhodamine in ethanol.
Figure 6B:
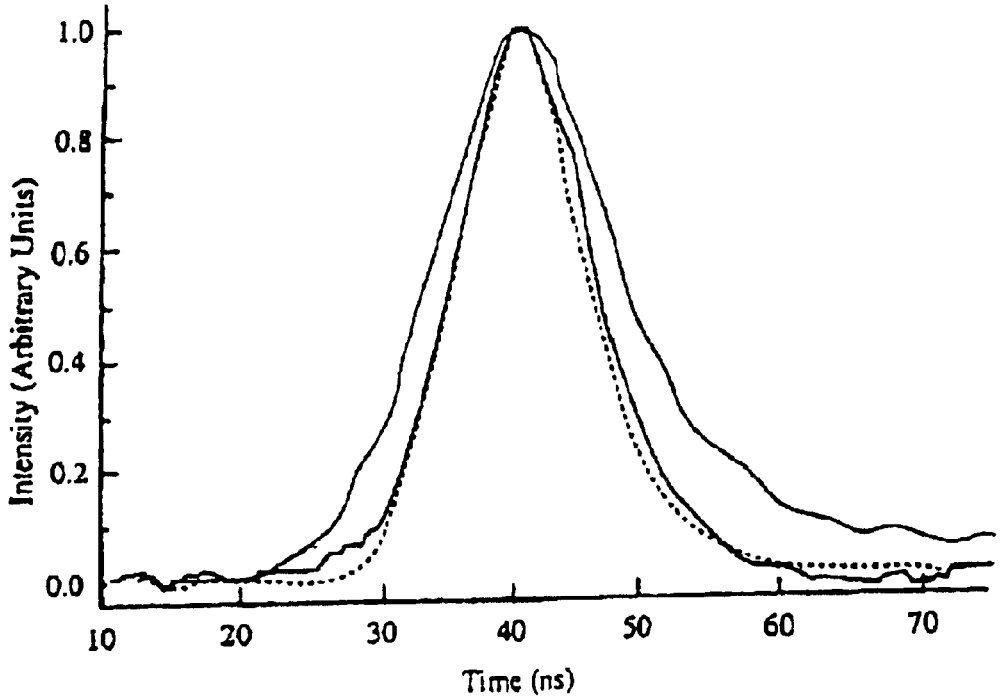
FIG. 6B is a two photon absorption excitation in a solution of rhodamine in ethanol.

In order to demonstrate the absorption of two photons of the same wavelength in the dye solutions and in the dye-doped polymers, we needed to prove the dependence of the visible emission intensity on the square of the intensity of the pump. The necessary proof in both liquid solutions and dye-doped polymers was obtained by varying the peak pump intensity and monitoring the resulting peak intensity of the signal. Calibrated neutral density filters were placed in the pump beam in these experiments. Data obtained from such measurements for a solution of $5\times10^{-4}$ M rhodamine pumped by the Q-switched $Nd^{3+}$:YAG laser are shown in FIG. 6A and demonstrated the square-law relationship. Additional confirmation was obtained since our detection system was fast enough to show that the signal wave form (e.g., the visible light intensity as a function of time) follows exactly the square of the pump pulse wave form. This type of data for the same dye solution is given in FIG. 6B. It is clear that the visible emission observed is due to two-photon absorption of the single pump source.

Two-photon absorption of a single infrared pump wavelength was observed in several of the dye-doped polymers (see Table 1). Some of the samples showed very strong visible emission and some much weaker. These plastics were designed for use in advertising displays and were not optimized for the present study. As a result, quantitative measurement of the emitted light was deferred until improved materials are received. In Table 1, the blue CYRO plastics 6122-8 and 6141-8 are seen to have produced no visible emission under excitation at approximately 850 nm. However, these two samples emitted quite well in the blue when excited with the $Cr^{3+}$:LiSAF laser tuned to approximately 800 nm (their absorption coefficient at approximately 400 nm is approximately 20 $cm^{-1}$). As a result, visible emission by dye-doped polymers of blue, green, yellow, and red light was obtained.

Experiments to show the absorption of two photons of two different infrared wavelengths in the dye solutions were conducted using both the Nd: YAG and Cr: LiSAF lasers. The use of a Stanford Research System model DG 535 pulse generator to Q switch both lasers resulted in very little interpulse jitter.

Figure 7:
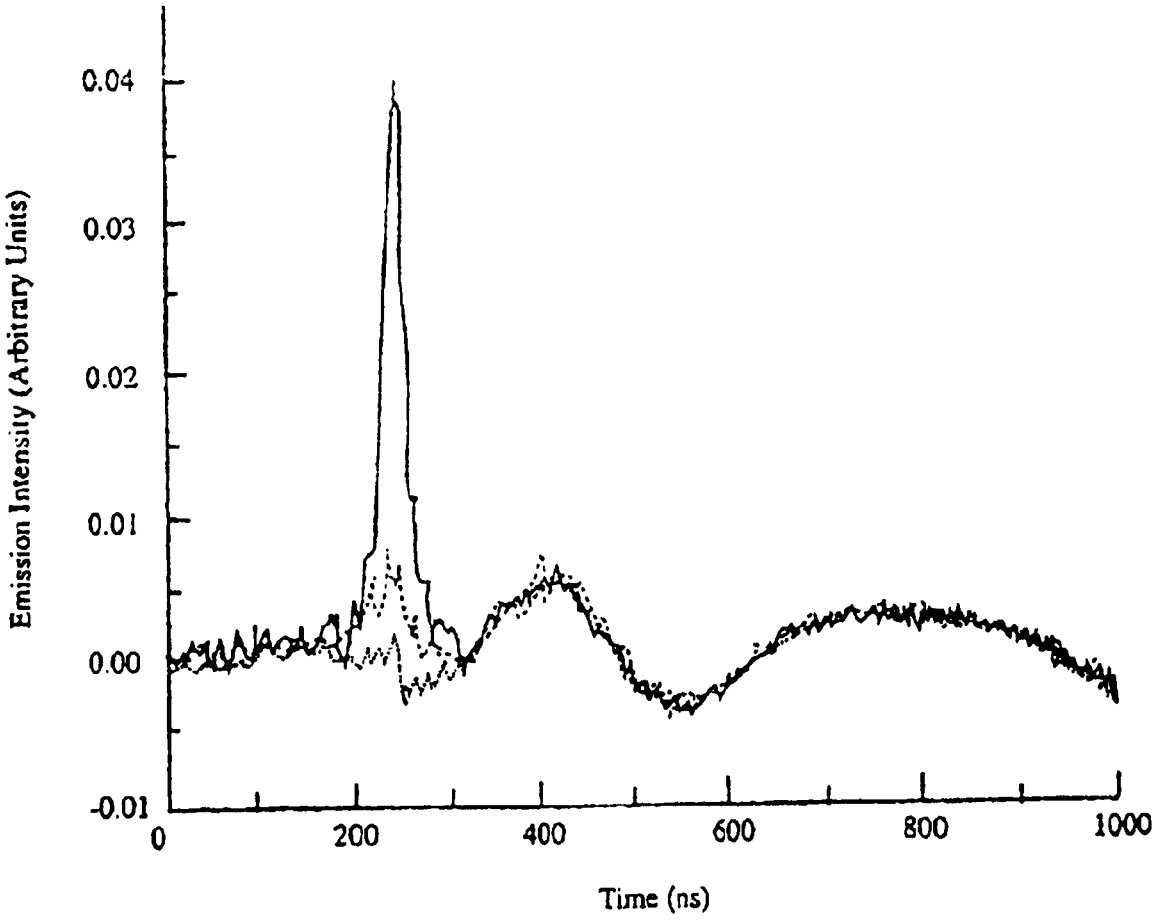
FIG. 7 shows the visible light emission excited in a solution of phyromethene in methanol by simultaneous two photon absorption of pump light at 1064 and 805 nm.

FIG. 7 demonstrates the visible emission by simultaneous absorption of two different frequency infrared light sources. In it, traces show no visible emission for the 1064 nm pump source alone and very little when using 805 nm alone. However, when both are delivered simultaneously there is strong visible light emission.

It should be noted that in some dye solutions with too small a Stokes shift, overlap between the absorption and emission regions causes the color of the observed visible emission to depend on the location of the emitting site within the sample. Thus, a solution that emits yellow light near the surface appears to emit a more reddish color when excited in the center of the sample. To reduce this effect, dye solutions with large Stokes shift (such as obtained in solutions of coumarin dyes) will be more attractive candidates for 3D display applications.

The experiments reported show that dyes in liquid and polymeric solutions can be excited to emit visible light by simultaneous absorption of two different infrared light sources. Since the region of overlap of two such beams can be moved around within the volume of such a medium, the visible emissions can be made to trace out a three-dimensional image. The result would be a real-time, three-dimensional display.

Some of the properties that an appropriately chosen dye should exhibit have already been identified. It should present a large Stokes shift and a narrow absorption band. It should also have a high coefficient of nonlinear absorption as well as high quantum efficiency. However, more research remains to be done to optimize the dye and the host material. The samples studied showed that laser damage was an issue with the laser pulse energies used in the demonstration. Attention should be given to make polymers free of scattering. The use of mode-locked diode lasers should enable the intensities necessary for effective nonlinear excitation of dye-doped media.

Liquid display media could be difficult to handle and possibly dangerous. On the other hand, with proper dye and polymer chemistry, polymers that efficiently emit visible light under the demonstrated excitation can be developed. Such dye-doped polymers will likely be able to serve as one-color displays. When dye/polymer combinations are more fully developed capable of blue, green, and red emission (see Table 1) three-color displays are possible. Since it is likely that unwanted intermolecular interactions will occur if all three dyes were placed in the same host, we suggest that the doped polymers could be powdered and then dispersed in a clear passive host polymer. In this model, the concentration of each emitting particulate should be such that there are many in each volume element of the display. As a result, each volume element could emit any desired color. Note that a polymer containing the dispersed particles could be prepared in sheet form and used as a two-dimensional display with single-wavelength excitation sources for each color. The LISA plastics were supplied by CYRO Industries, CT.

TABLE 1

| CYRO[a] LISA plastics Sheet number And color | Emission color | Absorption COefficient at 532 nm (in $cm^{-1}$) | Visible emission under Nd: YAG excitation | Absorption Coefficient near 425 nm (in $cm^{-1}$) | Visible emission under Cr: LiSAF excitation |
|---|---|---|---|---|---|
| 6122-8 blue | Blue | <0.5 | | 0.6 | |
| 6141-8 blue | Blue | <0.5 | | 0.6 | |
| GPF 564-9 Green | Green | <0.5 | | 7 | ** |
| 3105-5 yellow orange | Yellow | 22 | * | 2 | * |
| 411-5 orange-pink | Yellow | 26 | ** | 3 | *** |
| T-square Orange | Yellow | >40 | *** | 2 | *** |

TABLE 1-continued

| CYRO[a] LISA plastics Sheet number And color | Emission color | Absorption COefficient at 532 nm (in $cm^{-1}$) | Visible emission under Nd: YAG excitation | Absorption Coefficient near 425 nm (in $cm^{-1}$) | Visible emission under Cr: LiSAF excitation |
|---|---|---|---|---|---|
| 2124-3 dark orange | Orange | >28 | *** | 13 | * |
| 2123-2 orange red | Orange | >32 | *** | 12 | ** |
| 216-4 pink | Orange | 20 | * | 2 | *** |
| 2130-2 pink red | Yellow red | 8 | | 3 | ** |
| 2135-1 red | Yellow red | 16 | * | 7 | ** |

TABLE 1 is a list of dye-doped polymers tested and their properties. The visually observed emission strength is indicated by no asterisks for no emission to three for strong emission. The nonlinear emission was observed either with a 1064 nm Nd:YAG laser focused to about 100 $MW/cm^2$ with the sample or a 850 nm Cr:LiSAF laser focused to 30 $MW/cm^2$.

The invention has many applications. Military such as the Army can be used for terrain map presentation and analysis, visualization and prototyping for design and manufacturing, battlefield awareness and war fighter visualization of the battlefield. Other military and civilian applications are the need for 3D color displays in air traffic control. Medical applications can be used to help train physicians and health-care providers. Training on medical models of body organs and skeletal structure would allow medical persons to be able to train on images of their patients before and while caring for them.

Optically Written Displays

Figure 8:
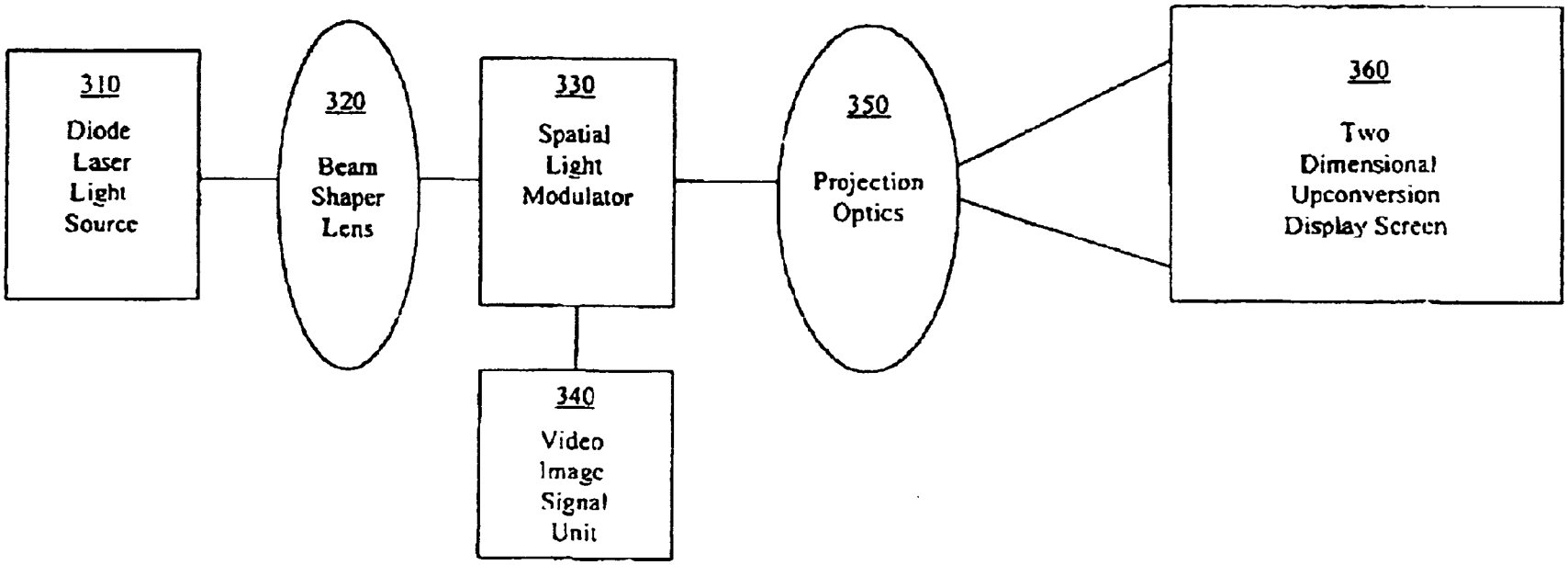
FIG. 8 illustrates an optically written projection display system using a single laser source.

FIG. 8 illustrates a preferred optical layout 300 for an optically written projection display system using a single laser source 310.

In FIG. 8 the layout components indicated include:

310 Single laser light source can be a near infrared emitting laser diode emitting in the range of approximately 950 to approximately 980 nm.

320 Beam Shaper lens for collection, shaping, and homogenization of the laser light.

330 Spatial Light Modulator device for simultaneously splitting and modulating the laser beam.

350 Projection Optics for projection of the modulated laser light onto the two dimensional upconversion display screen.

340 Video Image Signal Unit for conversion of video input to control and timing signals to Spatial Light modulator.

360 Two dimensional upconversion display screen. Screen can be a transmissive display and a reflective display.

Referring to FIG. 8, light can be generated from a single laser source 310 such as but not limited to from a vertical cavity surface emitting laser (VCSEL), a single laser diode type emitter, laser diode broad stripe emitter; laser diode bar, laser diode stack of bars, and the like and can be directed towards a beam shaper lens 320. The laser diodes can be diode lasers such as those manufactured by Novalux, JDS Uniphase, Spectra Diode Laser, IMC, OptoPower, and Coherent Inc. The beam shaper lens 320 can include but not be limited to a combination of optical surfaces and materials which can collimate the fast axis of the laser diode light while simultaneously collimating the slow axis of the laser diode and homogenizing the beam intensity distribution. Those familiar with the art to which the present invention pertains, will recognize however, that light output for an end-emitting semiconductor laser is more divergent in one transverse (x or y) axis than the other and is astigmatic. Lens 320 for collimating the output beam from such a laser and expanding it to the desired size are well-known in the optical art and can require a combination of one or more spherical, aspheric, toroidal, cylindrical (spherical and aspherical), micro-optic, and diffractive optical elements. Since the laser source is quasi-monochromatic, the beam shaper lens 320 is simplified.

Beam shaper lens 320 is intended to represent a group of one or more elements. The light is then directed using lenses, mirrors or prisms towards the spatial light modulator (SLM) 330, which will be described later in greater detail. Spatial light modulator (SLM) 330 can include but is not limited to an array of pixel generating elements that emit or reflect light of the display screen towards the projection lens. The SLM 330 modulates light and forms an image by turning the pixel-generating elements "on" or "off". This spatial light modulator 330 breaks the light image up into an array of M×N pixels where M and N can be any integer greater than 1. Depending on the type and selection of the spatial light modulator 330, the laser light will either be reflected off of or transmitted through the spatial light modulator towards the projection lens optics 350. Since the laser light is quasi-monochromatic and can also be polarized, a large number of different types of spatial light modulators 340 can be utilized in this invention. One example of a SLM is a DMD (digital micro-mirror device) by Texas Instruments (as described for example in U.S. Pat. No. 6,317,171 which is incorporated by reference). A DMD is an electromechanical device, whose pixel-generating elements form an array of thousands of tiny tilting mirrors. The DMD is mounted on top of a control circuitry, which provides individually addressable electrostatic forces, which can cause each mirror to selectively tilt. Laser light incident on the mirror array is reflected in one direction by the "on" state mirrors and in the other direction by mirrors in the "off" state. The pattern and timing of "on" versus "off" forms an image. Inmost applications, the light from the DMD mirrors in the "on" state is directed by a projection lens optics 350 to a screen 360. DMD arrays can have over 2 million individual mirrors in one device, sufficient for generating HDTV or UXGA displays.

An example of a one dimensional SLM (where M is 1) is a grating light valve (GLV) by Silicon Light Machines. The GLV architecture consists of a linear array of pixels oriented along a vertical column of image data. Once per image refresh, this linear array is optically scanned across the screen to produce a complete two-dimensional image. Therefore, the use of a GLV or any 1-dimensional spatial light modulator in this invention would also require the use of an additional one dimensional scanner to for a two-dimensional image.

Another SLM 330 that can be used with the subject invention can be a Silicon Light Machines Grating Light Valve (GLV), such as those described in U.S. Pat. No. 5,982,553 which is incorporated by reference. The GLV chip can consist of tiny reflective ribbons mounted over a silicon chip, where each ribbon is approximately 100 fentometers long, approximately 100 nanometers wide and approximately 3 fentometers thick. The ribbons can be suspended over the chip with a small airgap in between. When a voltage is applied to the chip below the ribbon, the ribbon moves toward the chip by a fraction of the wavelength of the illuminating light. The deformed ribbons can form a diffraction grating and the various orders of light can be combined to form the pixel of an image.

The Different types of Spatial Light Modulators 330 can include:

1) Digital Micromirror device(DMD) also known as a Digital Light Projector(DLP)
2) Grating Light Valve (GLV)
3) Any Micro Electro Mechanical System (MEMS)
4) Liquid Crystal on Silicon (LCOS)
5) Liquid Crystal Display (LCD)
6) Polysilicon LCDs
7) Ferro Electric Crystal (FEC)
8) Electron Beam written Spatial Light Modulator (E-beam SLM)
9) Electrically Switchable Bragg Gratings (ESBGs)

Referring to FIG. 8, the SLM(s) 330 can be driven by a Video Image Signal Unit (VISU) 340 which provides the proper voltages to each individual mirror in order to form the image. The video input format can be any standard analog or digital format such as but not limited to VGA(video graphics array), XGA(extended graphics array), UXGA(ultra extended graphics array), NTSC(National Television Standards Committee format), PAL(phase alternation by line) format, SECAM(Systeme Couleur Avec Memoire) format, HDTV(high definition television), and the like. The projection lens (d) may be either front or rear projection, depending on whether the lens is on the viewer side of the screen or behind the screen.

The projection lens optics 350 can be a combination of optical surfaces and materials, which image the spatial light modulator(SLM) 330 onto the upconversion display screen 360. Lens optics 350 for projecting the light from a spatial light modulator 330 are well-known in the optical art and can require a combination of one or more spherical, aspheric, toroidal, cylindrical (spherical and aspherical), micro-optic, and diffractive optical elements. Since the laser light in this embodiment is quasi-monochromatic, the projection lens optics 350 can be simplified and can even be a single element since the projection lens optics 350 does not need to compensate for chromatic aberration as in typical Red, Green, Blue (RGB) display projection systems. Additionally the anti-reflective coating for both the projection optics 350 and beam shaper lens optics 320 can be simplified due to the ability to use less expensive anti-reflective coating such as a "V coating" or single layer coatings.

The up conversion screen 360 used in FIG. 8 can be one that is described in detail in U.S. Pat. No. 6,327,074 which is incorporated by reference. Screen 360 can include an array of pixels positioned on the screen surface where there can be as many as three families of pixels. Each pixel in a family of pixels contains particles of a rare earth doped crystal or other medium that can absorb near infrared light and up convert it to the visible dispersed in a passive host medium. When illuminated with near infrared light from the laser source 310, beam shaper optics lens 320, spatial light modulator 330 and projection optics lens 350 described above and indicated in the figures, the material in the pixels of each family in screen 360 can emit visible light that is red, green or blue. The display screen areas between the pixels can be any color but preferentially it would be black. When only one family of pixels is present the display will be a monochromatic display. When there are two families of pixels the display would produce two colors and their combinations. When there are three families of pixels the display would produce three colors and their combinations. The preferred colors are red green and blue so that the display can produce full color images as in color television or motion picture displays. The materials that can be used in the pixels to comprise the light emitting aspects of the display screen 360 are described in this patent and in U.S. Pat. No. 6,327,074 but are not limited to just those described. Materials that can be prepared in particles that can absorb near infrared laser light and up convert it into visible emission can be used in the up conversion display screen.

Figure 9A:
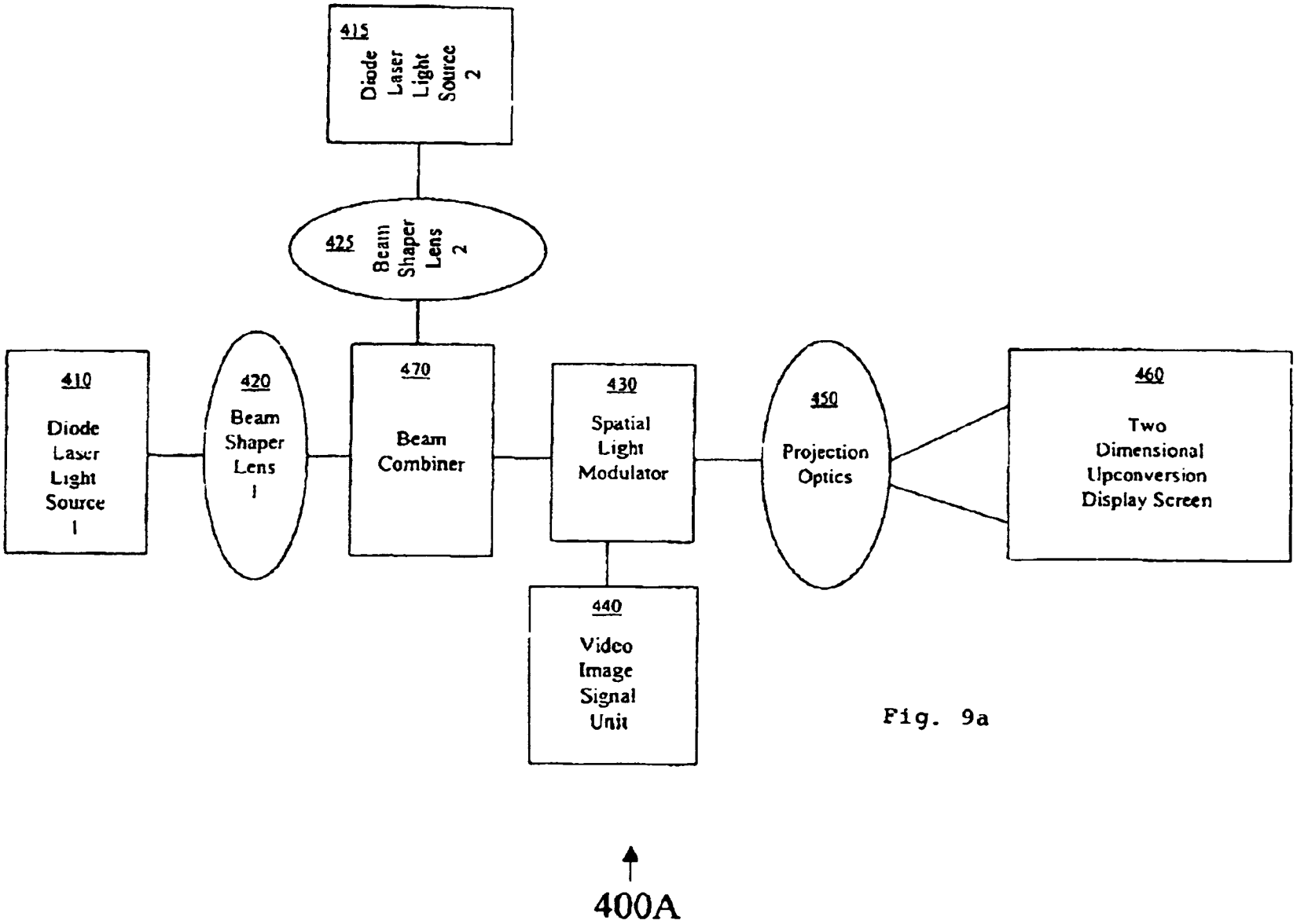
FIG. 9a illustrates optically written projection display systems using two laser sources where they both utilize the same spatial light modulator.
Figure 9B:
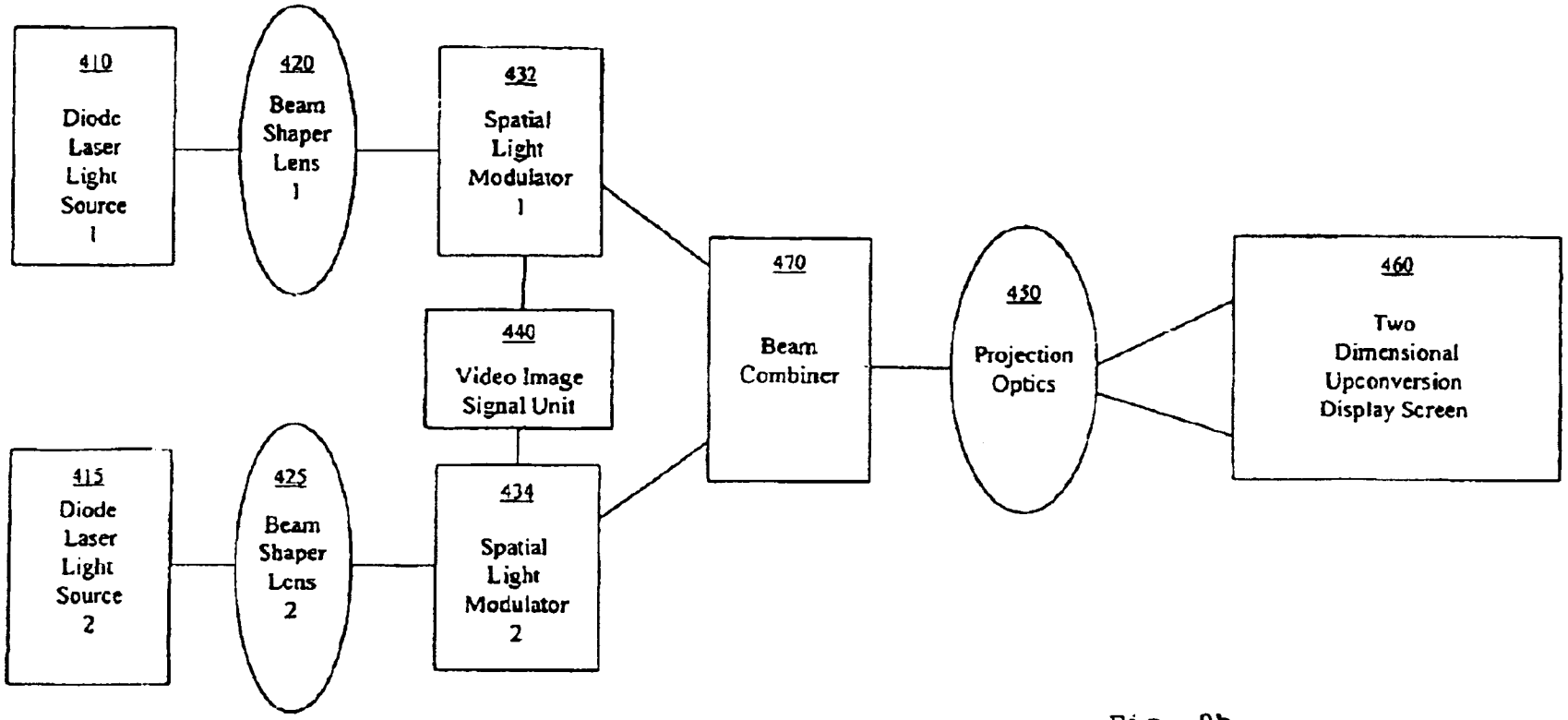
FIG. 9b illustrates optically written projection display systems using two laser sources where they each utilize their own spatial light modulator.

FIGS. 9a and 9b each show optically written projection display systems 400A, 400B using two laser sources 410, 415. The two laser sources 410, 415 can be combined with a beam combiner 470 such as but not limited to a dicrhroics, gratings, and holographic optical elements. Beam shaper lens 420, 425, Spatial Light Modulators 430, 432, 434, video image signal unit 440, projection lens optics 450 and two dimensional upconversion display screen 460 can use similar numbered components that were used and described in reference to FIG. 8.

FIG. 9a shows a laser configuration 400A where each single laser source 410, 415 passes light through respective beam shaper lens 420, 425, into beam combiner 470 and into one spatial light modulator 430, and where components 440, 450 and 460 are similar to and function similar to those components 340, 350, 360 of FIG. 8 described above.

FIG. 9b shows a laser configuration 400B where each single laser source 410, 415 have their own SLM 432, 434, which are fed by a single video image signal unit 440, combined by a beam combiner 470 and passed to projection optics lens 450 and to screen 460 in a similar manner to components described in reference to FIG. 8.

Figure 10A:
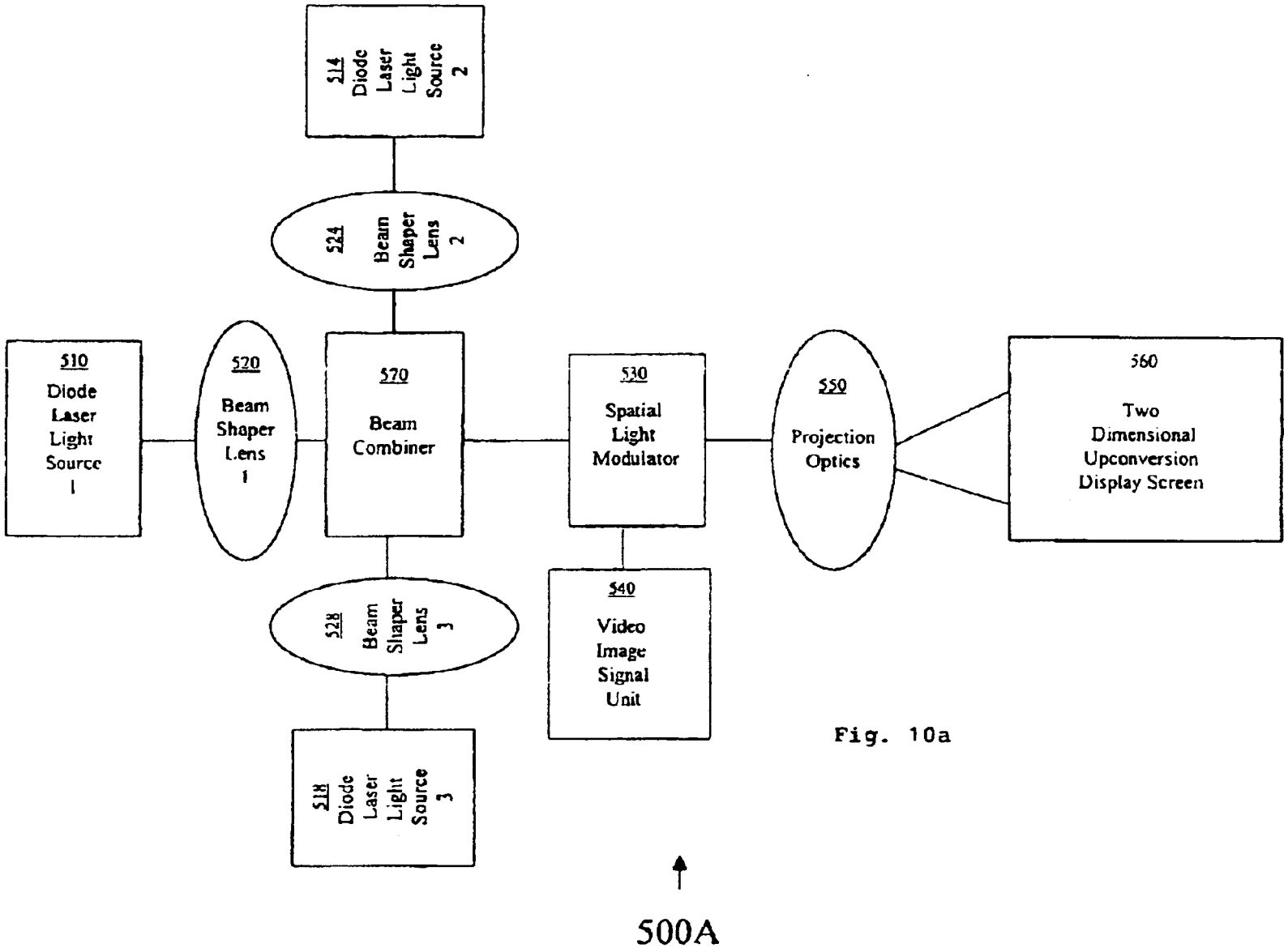
FIG. 10a illustrates optically written projection display systems using three laser sources where they all utilize the same spatial light modulator.
Figure 10B:
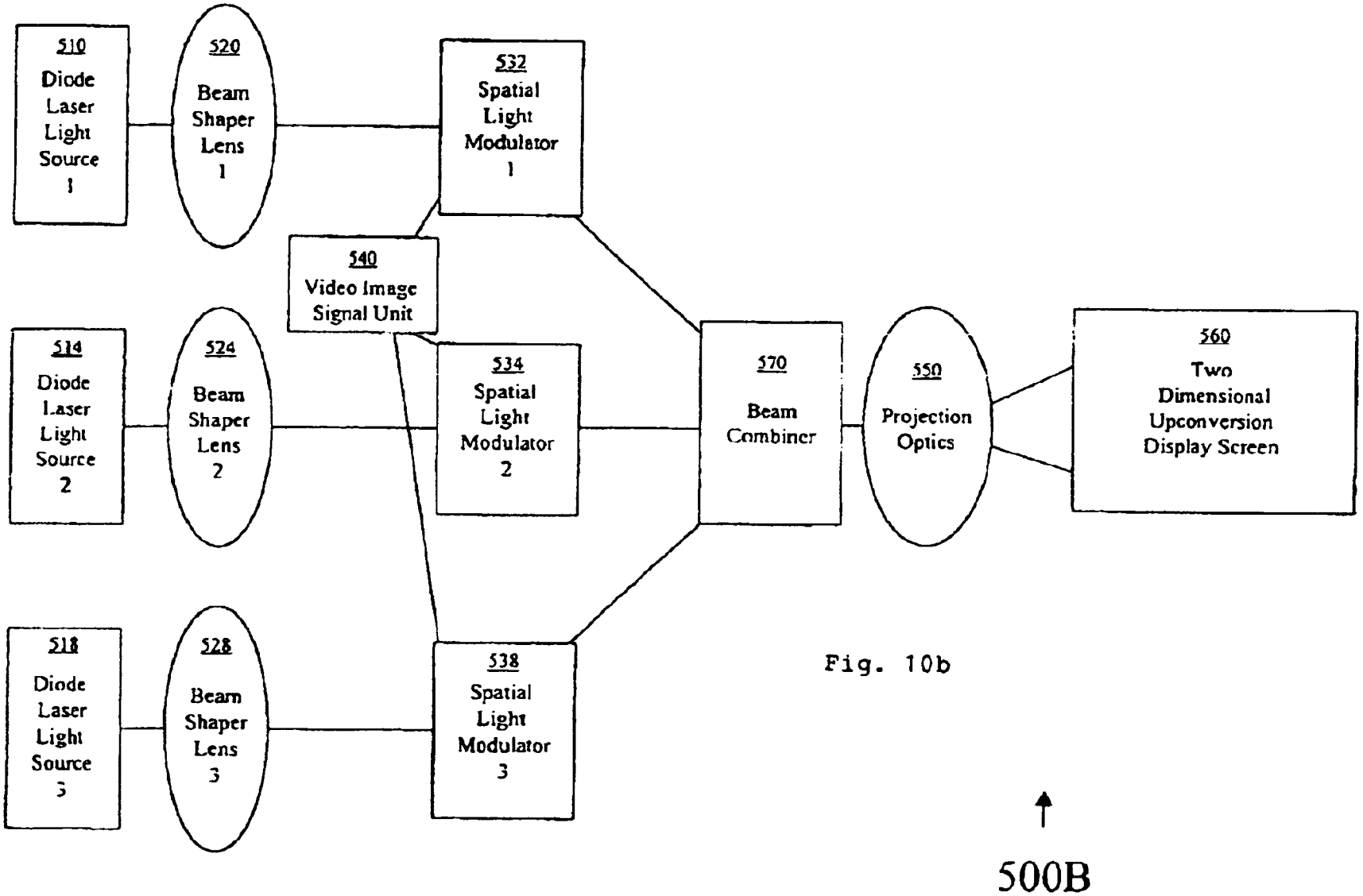
FIG. 10b illustrates optically written projection display systems using three laser sources where they each utilize their own spatial light modulator.

FIGS. 10a and 10b illustrates optically written projection display systems using three laser sources 510, 514, 518. Similar to FIGS. 9a, 9b, the three laser sources 510, 514, 518 can be combined by a beam combiner 570 such as but not limited to those using dichroics, gratings and holographic type optical elements. Beam shaper lens 520, 524, 528, Spatial Light Modulators 530, 532, 534, 538, video image signal unit 540, projection lens optics 550 and two dimensional upconversion display screen 560 can use similar numbered components that were used and described in reference to FIGS. 8, 9a and 9b.

FIG. 10a shows a laser configuration 500A where each single laser source 510, 514, 518 passes light through respective beam shaper lens 520, 524, 528, into a beam combiner 570 and into one spatial light modulator 530, and where components 540, 550 and 560 are similar to and function similar to those components 340, 350, 360 of FIG. 8 and those similar numbered components in FIGS. 9a, 9b described above.

FIG. 10b shows a laser configuration 500B where each single laser source 510, 514, 518 passes light through respective beam shaper lens 520, 524, 528 and into three respective SLMs 532, 534, 538 each receiving signals from a common video image unit 540, where the signals are then combined in a beam combiner 570 passed through projection optics 550 and to screen 560 in a manner similar to those similarly numbered components described above. Unlike, the single SLM 530 in FIG. 10a, in FIG. 10b, each laser source 520, 524, 528 has their own respective SLMs 532, 534, 538.

Red(R), Green(G) and Blue(B) Efficiencies

Data from experimentation has shown that blue light can be efficiently generated by Yb,Tm:YLF(yttrium lithium fluoride) when pumped with diode laser light having a wavelength of approximately 958 to approximately 959 mm, green visible light can be efficiently generated by Yb,Er:NYF(sodium yttrium fluoride) when pumped with diode laser light having a wavelength of approximately 976 mm, and red visible light can be efficiently generated by Yb,Er:KYF(potassium yttrium fluoride) when pumped with diode laser light having a wavelength of approximately 973.5 nm.

The definitions and units discussed in this section are as follows:

nm refers to nanometer a.u. refers to arbitrary unit

Er refers to Erbium

Tm refers to Thulium

Yb refers to Yterbium

NYF refers to $NaYF_4$ or sodium yttrium fluoride

YF3 refers to yttrium fluoride

Figure 11:
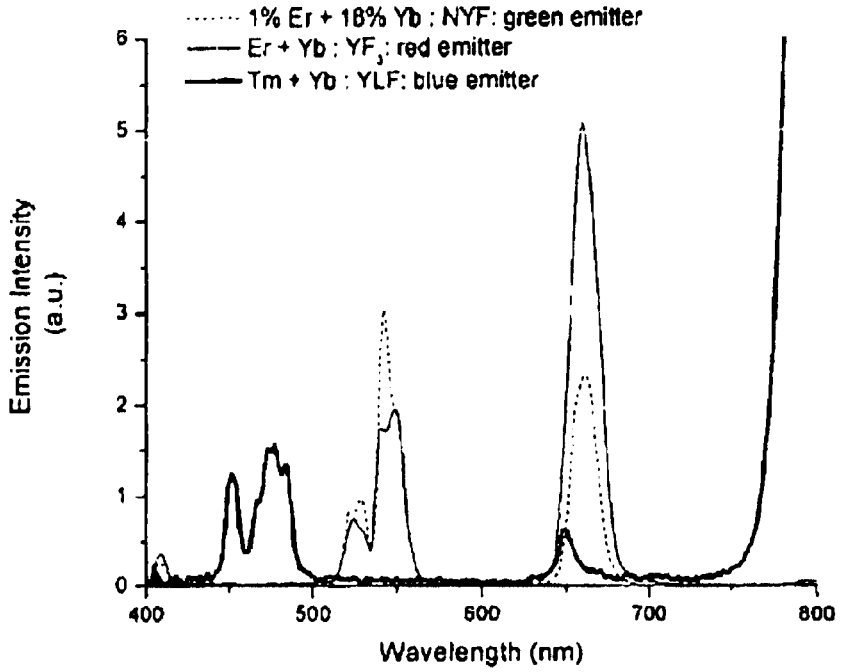
FIG. 11 is an emission spectra graph showing the three materials used produce sharp lines at 545 nm(green), 655 nm(red) and 450, 475 nm(blue).

YLF refers to $YLiF_4$ or lithium yttrium fluoride mW refers to milliwatt or $10^{-3}$ Watt ms refers to millisecond or 10-3 second, ns is nanosecond or $10^{-9}$ second Lm refers to Lumen Cd refers to Candela and $Cd/m^2$ is Candela per square meter 1. Emission Spectra FIG. 11 is an emission spectra graph showing the three materials used produce sharp lines resulting in broad color gamuts(deep colors of green, red and blue). The material 1% Er+18% Yb:NYF produced sharp lines at approximately 545 nm as a green emitter. The material Er+YB: YF produced sharp lines at approximately 655 nm as a red emitter. The material TM+YB: YLF produced sharp lines at approximately 450 nm and at approximately 475 nm as blue emitters.

2. Excitation Spectra

Figure 12:
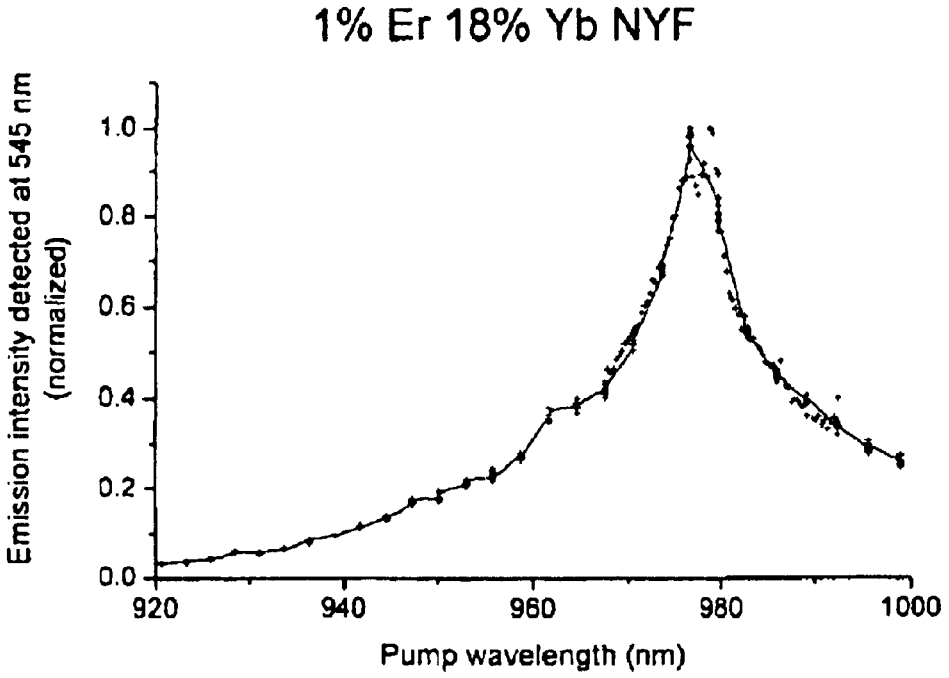
FIG. 12 is an excitation graph for the material 1% Er 18% Yb NYF as a Green emitter.

FIG. 12 is an excitation graph for the material 1% ER 18% Yb NYF as a Green emitter. This graph shows that the peak excitation wavelength for Yb, Er:NYF is approximately 976 nm for Green.

Figure 13:
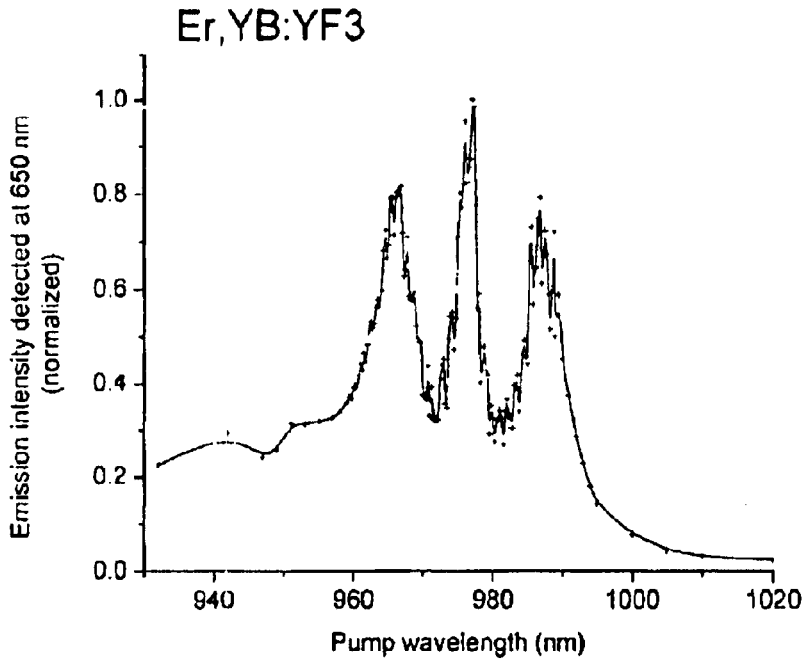
FIG. 13 is an excitation graph for the material Er, Yb:YF3 as a Red emitter.

FIG. 13 is an excitation graph for the material Er, YB:YF3 as a Red emitter. This graph shows that one peak excitation wavelength for Yb,Er: $YF_3$ is 976 nm, which is the same as our best green emitter. It is therefore possible to efficiently excite two colors (green and red) with the same pump wavelength(approximately 976 nm), reducing the number of laser sources such as laser diodes in the system which would inherently reduce the cost over using plural laser sources.

Figure 14:
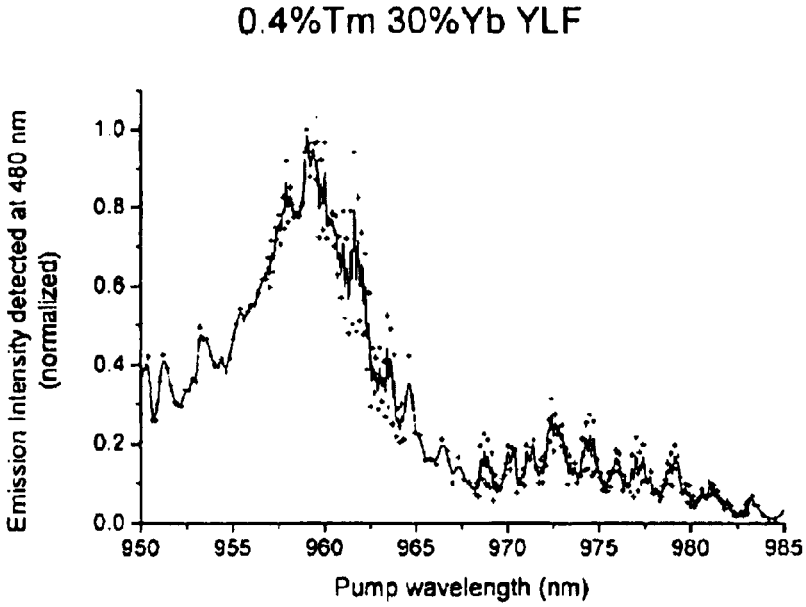
FIG. 14 is an excitation graph for the material 0.4% Tm 30% Yb YLF as a Blue emitter.

FIG. 14 is an excitation graph for the material 0.4% Tm 30% YB YLF as a Blue emitter. This graph shows that the peak excitation wavelength for Yb,Tm:YLF is approximately 959 nm. The excitation pulse used for the excitation spectra measurement is approximately 4 ns long so the quadratic process in the material is not saturated. These spectra were measured using powdered material in p-PMMA inside a cabochon.

3. Current cw Efficiency Values for a Fixed Spot Size

The inventors used a calibrated spectroradiometer with an integrating sphere to measure the visible emitted power for the different materials. The diode laser used was a approximately 500-mW 976 nm single emitter for the Green and the Red emitters, and an approximately 1-W 959 nm diode laser for the Blue emitter.

The efficiencies were measured by reflection and a metallic mirror which was used behind the sample in order to collect all the visible light emitted. The size of the excited spot was determined by the divergence of our diode laser, the focus lengths of our collimating lenses, the physical dimensions of our integrating sphere, and the final focusing through the cabochon. We estimate the emitting spot to be approximately 1 mm in diameter.

Figure 15:
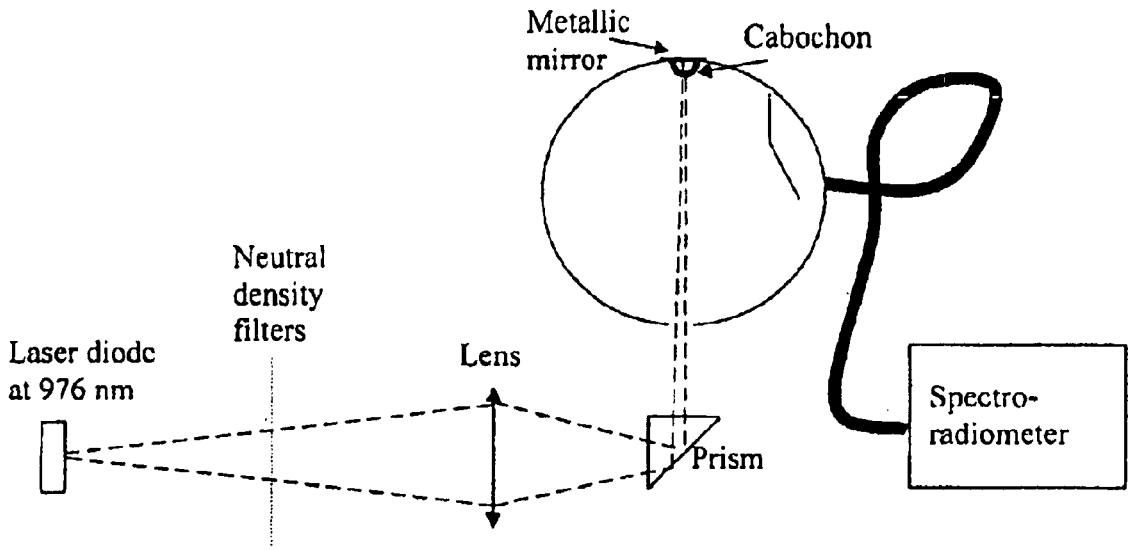
FIG. 15 shows an experimental set-up used to measure the efficiencies for the Green, Red and Blue emitters.

FIG. 15 shows an experimental set-up 600 used to measure the efficiencies for the Green, Red and Blue emitters. Here is the experimental set-up we used for these experiments. Referring to FIG. 14, single laser source 610 such as a laser diode operates at approximately 976 nm passes into neutral density filters 620 which reduces intensity without changing the wavelength. For example, filter 620 can let approximately 1/10 of the light intensity to pass through. Next lens 630 such as a convex lens focuses the beam to a prism 640 such as a 45-45-90 prism made of the optical glass entitled: BK7. A sphere 650 such as an integration sphere of Instrumentation Instruments having an internal metallic mirror 652 behind an Cabochon 654, and to an instrument system 660 such as a spectro-radiometer to measure the ouput.

Figure 16:
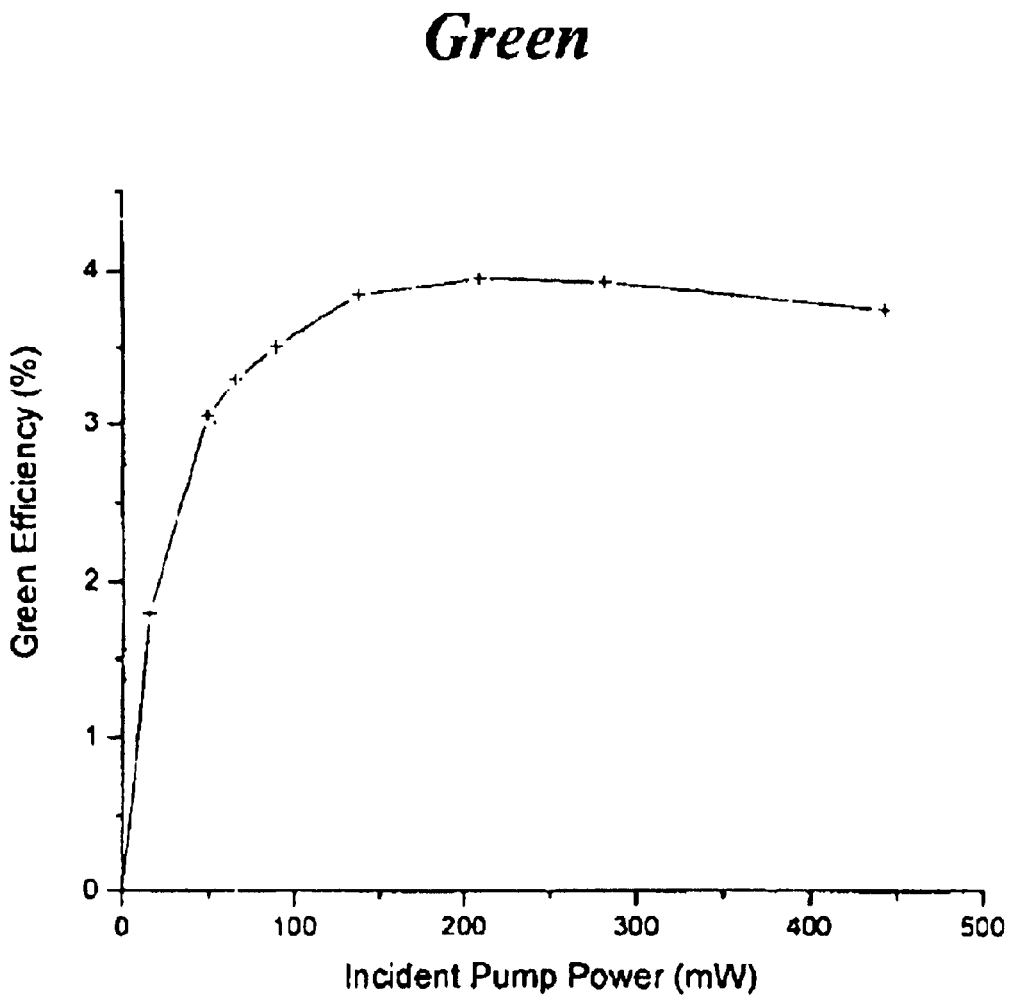
FIG. 16 shows an efficiency percent graph for the Green emitter.
Figure 17:
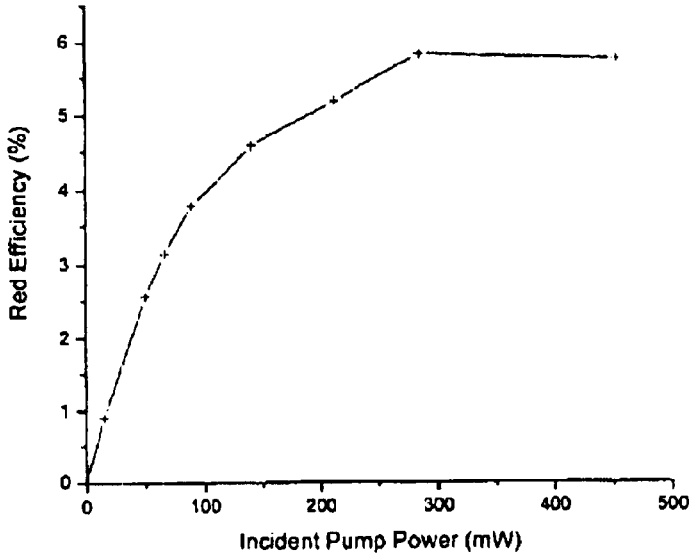
FIG. 17 shows an efficiency percent graph for the Red emitter.
Figure 18:
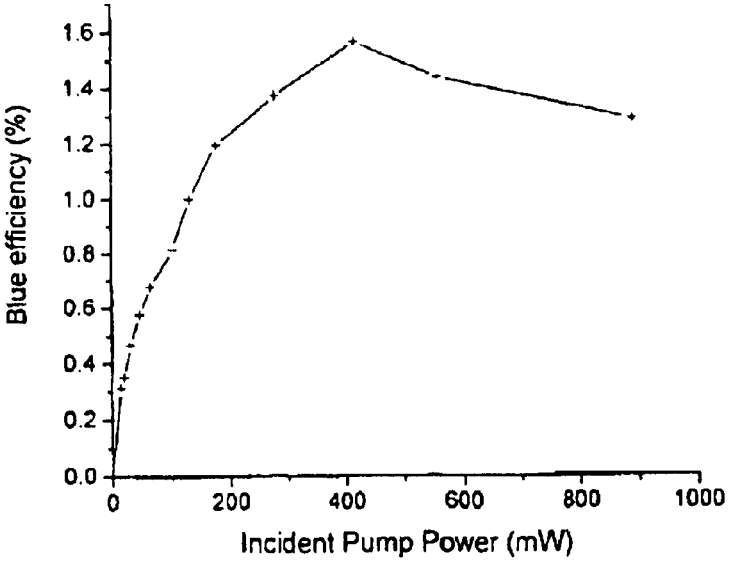
FIG. 18 shows an efficiency percent graph for the Blue emitter.

The graphs of FIGS. 16, 17 and 18 were obtained by directly dividing the emitted power recorded by the incident infrared power measured at the sample. The incident power was changed by adding neutral density filters in order to avoid any wavelength shift caused by varying the current on the diode laser driver.

FIG. 16 shows an efficiency percent graph for the Green emitter. Thus, the efficiency value for Green approaches approximately 4% at a spot size of approximately 1 mm in diameter.

FIG. 17 shows an efficiency percent graph for the Red emitter. Thus, the efficiency value for Red approaches approximately 6% at a spot size of approximately 1 mm in diameter.

FIG. 18 shows an efficiency percent graph for the Blue emitter. Thus, the efficiency value for Blue approaches approximately 1.6% at a spot size of approximately 1 mm in diameter.

As to the efficiency with respect to absorbed power the inventors have recorded the unabsorbed IR power measured by the integrating sphere. We estimate that the limit efficiency measured with respect to absorbed power would be between approximately 10 and approximately 15% for the 3 colors(Green, Red, and Blue).

4. Efficiency vs. Average Power For Several Excitation Durations & Fixed Spot Size In order to check the effect of pulse duration on the efficiency of pumping, we used a mechanical chopper(which continuously cuts light) rotating at approximately 30 Hz with variable slit sizes. The duration of pumping was measured using a fast oscilloscope and a photodiode at the sample location. The average power was measured for various neutral density filters and for each slit size.

We measured the brightness obtained from an approximately 500 micron spot. For the green and red emitters, we used our fiber coupled approximately 968 nm diode laser array capable of delivering approximately 5 to approximately 6 W of cw radiation. The quantity plotted on the vertical axis in the graphs in FIGS. 19, 20 and 21 below is obtained by dividing the brightness measured (from a few $Cd/m^2$ to approximately 100,000 $Cd/m^2$) by the incident IR power measured at approximately 968 nm. The values obtained are related to the efficiency of the material. We scaled the graphs to the limit efficiency value measured for absolute efficiency when cw pumping with the approximately 976 nm diode (approximately 4% for Green, approximately 5.85% for Red). For the blue emitter, we used the brightness measured when exciting with an approximately 959 nm diode and then scaled to the value when cw pumping at approximately 959 nm (approximately 1.5%) directly.

Figure 19:
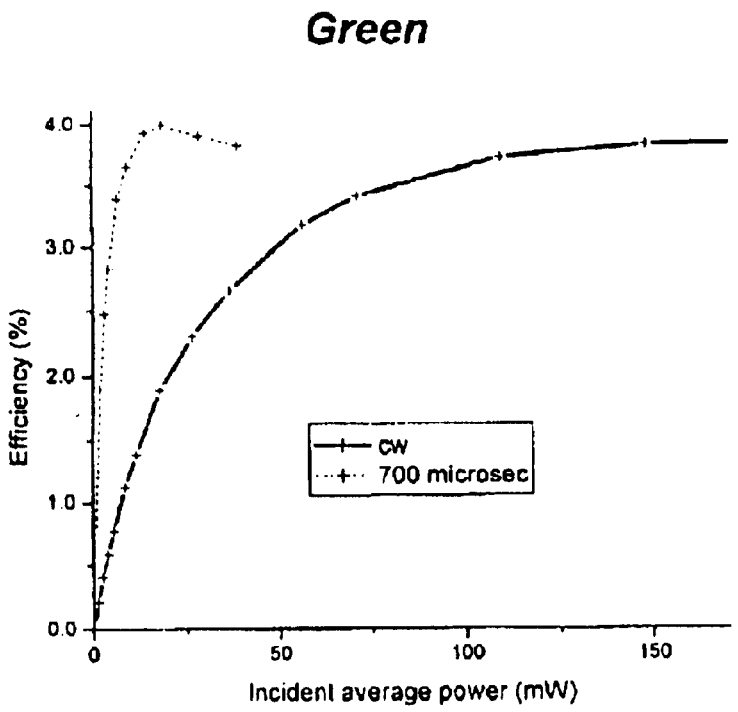
FIG. 19 is a graph of efficiency vs. average power for the Green emitter.

FIG. 19 is a graph of efficiency vs. average power for the Green emitter with efficiency value approaching approximately 4%.

Figure 20:
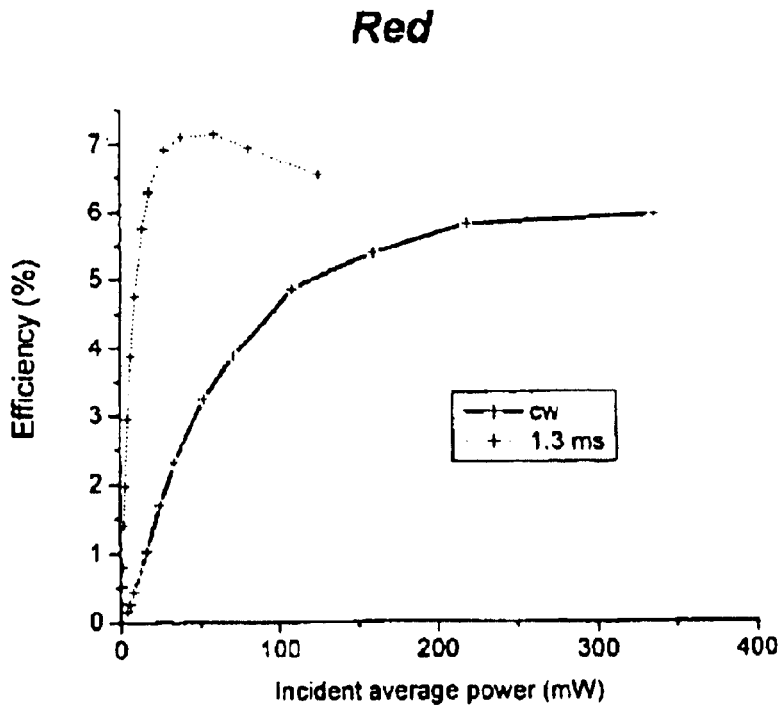
FIG. 20 is a graph of efficiency vs. average power for the Red emitter.

FIG. 20 is a graph of efficiency vs. average power for the Red emitter with efficiency value approaching approximately 6%.

Figure 21:
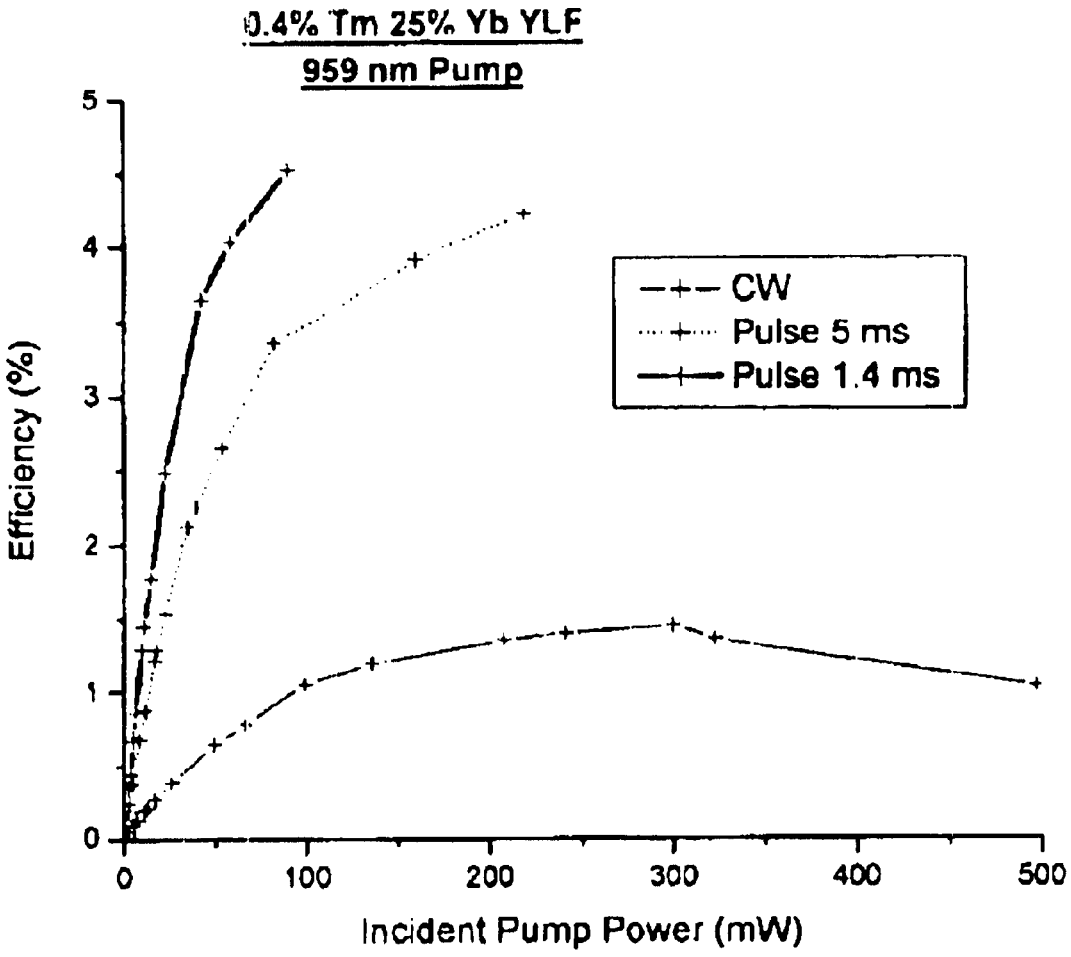
FIG. 21 is a graph of efficiency vs. average power for the Blue emitter.

FIG. 21 is a graph of efficiency vs. average power for the Blue emitter with efficiency value approaching approximately 1.5%.

For the Green and Red, the increase in maximum efficiency is not significant when pulse pumping. However, the above graphs show that one reaches higher efficiencies for smaller pump powers when pumping with a short, intense pulse. For the blue, the change is quite significant, and we gain a factor of at least approximately 3 in maximum efficiency when pumping with a short pulse without even reaching saturation of the efficiency.

Table 2 is a summary table of the limit efficiency of the RGB upconverters:

TABLE 2

| Color | Green Yb,Er:NYF | Red Yb:Er:$YF_3$ | Blue Yb,Tm:YLF |
|---|---|---|---|
| Limit efficiency when pumped cw at 976 nm Output W/incident W Lm/incident W | 4% 26.4 Lm/W | 5.9% 5.9 Lm/W | >0.9% 0.72 Lm/W |
| Estimated Limit efficiency for pulse pumping at 976 nm Output W/incident W Lm/incident W | 4% 26.4 Lm/W | 7% 7 Lm/W | 1.8% 1.4 Lm/W |
| Limit efficiency when pumped cw at 959 nm Output W/incident W Lm/incident W | N/A | N/A | 1.5% 1.2 Lm/W |
| Estimated Limit efficiency for pulse pumping at 959 nm Output W/incident W Lm/incident W | N/A | N/A | 4.5% 3.6 Lm/W |

The top row is the limit efficiency when the materials in the various columns are pumped at a continuous wave(cw) at approximately 976 nm, with values for both: output power (W) divided by incident pumped power(W); and for lumens (Lm) per Watt(W).

The second row is an estimated limit efficiency for pulse pumping at approximately 976 nm, with values for both; output power(W) divided by incident pumped power(W); and for lumens(Lm) per Watt(W).

The third row is the limit efficiency when the materials in the various columns are pumped at a continuous wave(cw) at approximately 959 nm, with values for both: output power (W) divided by incident pumped power(W); and for lumens (Lm) per Watt(W).

The fourth row is the estimated limit efficiency when the materials in the various columns for pulse pumping at approximately 959 nm, with values for both: output power (W) divided by incident pumped power(W); and for lumens (Lm) per Watt(W).

As demonstrated in Table 2, a single laser source pumped at approximately 976 nm can cause emissions of three colors (Green, Red, and Blue) having an efficiency of at least 2% for all three colors.

Additionally, a single laser source pumped at approximately 976 nm can cause emissions of at least two colors (Green and Red) having an efficiency of at least approximately 4% for the two colors.

Table 2 further demonstrates that Red emissions can have an efficiency of at least approximately 7% when being pulse pumped by laser source at approximately 976 nm.

Additionally, Table 2 demonstrates blue emissions can have an efficiency of at least 4.5% when being pulse pumped by a laser source at approximately 959 nm.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein arc particularly reserved especially as they fall within the breadth and scope of the claims here appended.

We claim:

1. A method of displaying [two dimensional] images *on a display medium configured to display images in at least two dimensions*, comprising [the steps of]:

generating a light beam from a light source having an infrared wavelength range of approximately 950 nm to approximately 980 nm;

[simultaneously] splitting and modulating the light beam into at least two light beams;

projecting the at least two light beams [with an optic means] onto [a] *the* display medium; and displaying [two dimensional] images on the display medium having at least one visible color by a multiplicity of the light beams.

2. The method of claim 1, wherein the light source includes:

an infrared laser diode source.

3. The method of claim 1, wherein [the] *said* displaying [step] includes[the step of]:

illuminating a multiplicity of pixels in the display medium.

4. The method of claim 3, wherein the pixels include:

Yb,Tm:YLF(yttrium lithium fluoride) particles.

5. The method of claim 4, wherein at least one of the light beams includes:

a wavelength of approximately 958 to approximately 959 nm, and the one visible color includes a blue light having a limit efficiency of at least approximately 2%.

6. The method of claim 3, wherein the pixels include:

Yb,Er:NYF(sodium yttrium fluoride) particles.

7. The method of claim 6, wherein at least one of the light beams includes:

a wavelength of approximately 976 nm, and the one visible color includes a green light having a limit efficiency of at least approximately 4.5%.

8. The method of claim 6, wherein at least one of the light beams includes:

a wavelength of approximately 976 nm, and the one visible color includes a red light having a limit efficiency of at least approximately 7%.

9. The method of claim 6, wherein at least one of the light beams includes:

a wavelength of approximately 976 nm, and the one visible color includes a red light having a limit efficiency of at least approximately 2%.

10. The method of claim 6, wherein at least one of the light beams includes:

a single wavelength of approximately 976 nm, and the one visible color emitted from the single wavelength includes both a green light and a red light having a minimum limit efficiency of at least approximately 4%.

11. The method of claim 6, wherein at least one of the light beams includes:

a single wavelength of approximately 976 nm, and the one visible color emitted from the single wavelength includes: a green light and a red light and a blue light having a minimum limit efficiency of at least approximately 2%.

12. The method of claim 3, wherein the pixels include:

Yb,Er:KYF(potassium yttrium fluoride) particles.

13. The method of claim 12, wherein at least one of the light beams includes:

a wavelength of approximately 973.5 nm, and the one visible color includes a red light.

14. The method of claim 1, wherein the display medium includes:

a transmissive display scanner-modulator device.

15. The method of claim 1, wherein the display medium includes:

a reflective display scanner-modulator device.

16. The method of claim 1, wherein [the step of] *said* displaying includes[the step of]:

forming one visible light color by uniformly dispersing identical pixels throughout the medium.

17. The method of claim 1, wherein [the step of] *said* displaying includes[the step of]:

forming two different visible colors by uniformly dispersing at least two different families of pixels throughout the medium.

18. The method of claim 1, wherein [the step of] *said* displaying includes[the step of]:

forming three different visible colors by uniformly dispersing at least three different families of pixels throughout the medium.

19. The method of claim 1, wherein [the step of simultaneously] *said* splitting and modulating the light beam includes: [simultaneously] splitting and modulating the light beam with a spatial light modulator(SLM).

20. The method of claim 19, wherein [the step of simultaneously] *said* splitting and modulating the light beam includes: [simultaneously] splitting and modulating the light beam with a micro electro mechanical system(MEMS) device.

21. The method of claim 19, wherein [the step of simultaneously] *said* splitting and modulating the light beam includes: [simultaneously] splitting and modulating the light beam with a liquid crystal display(LCD).

22. The method of claim 19, wherein [the step of simultaneously] *said* splitting and modulating the light beam includes: [simultaneously] splitting and modulating the light beam with a digital micromirror device(DMD).

23. The method of claim 19, wherein [the step of simultaneously] *said* splitting and modulating the light beam includes: [simultaneously] splitting and modulating the light beam with a digital light projector(DLP).

24. The method of claim 19, wherein [the step of simultaneously] *said* splitting and modulating the light beam includes: [simultaneously] splitting and modulating the light beam with a grating light valve(GLV).

25. The method of claim 19, wherein [the step of simultaneously] *said* splitting and modulating the light beam includes: [simultaneously] splitting and modulating the light beam with a liquid crystal on silicon(LCOS) device.

26. The method of claim 19, wherein [the step of simultaneously] *said* splitting and modulating the light beam includes: [simultaneously] splitting and modulating the light beam with a polysilicon liquid crystal display(LCD).

27. The method of claim 19, wherein [the step of simultaneously] *said* splitting and modulating the light beam includes: [simultaneously] splitting and modulating the light beam with an electron beam written spatial light modulator (E-beam SLM).

28. The method of claim 19, wherein [the step of simultaneously] *said* splitting and modulating the light beam includes: [simultaneously] splitting and modulating the light beam with an electrically switchable Bragg Grattings (ESBGs) device.

29. The method of claim 1, wherein [the step of] *said* generating includes:

generating a light beam from a single light source pumping at one wavelength to form at least two different colors in the display medium.

[30. The method of claim 29, wherein the generating step includes the step of:

forming the colors of Green and Red in the display medium from the generated beam pumped at the wavelength of approximately 976 nm with a limit efficiency of at least approximately 4%.]

[31. The method of claim 1, wherein the step of generating includes:

generating a light beam from a single light source pumping at one wavelength to form at least three different colors in the display medium.]

[32. The method of claim 31, wherein the generating step includes the step of:

forming the colors of Green, Red and Blue in the display medium from the generated beam pumping at the wavelength of approximately 976 nm with a limit efficiency of at least 2%.]

[33. A method of forming blue light emissions in a display medium, comprising the steps of:

generating a light beam having a wavelength of approximately 958 nm to approximately 959 nm from a diode laser light source;

absorbing a portion of the light beam in a display medium containing Yb,Tm:YLF(yttrium lithium fluoride); and forming a blue visible light in the display medium by particles excited by the light beam having a limit efficiency of at least approximately 4.5%.]

[34. A method of forming green light emissions in a display medium, comprising the steps of:

generating a light beam having a wavelength of approximately 976 nm from a diode laser light source;

absorbing a portion of the light beam in a display medium containing Yb,Er:NYF(sodium yttrium fluoride); and forming a green visible light in the display medium by particles excited by the light beam having a limit efficiency of at least approximately 4%.]

35. A method of forming red light emissions in a display medium, comprising[the steps of]:

generating a light beam having a wavelength of approximately 973.5 nm to approximately 976 nm from a diode laser light source;

absorbing a portion of the light beam in a display medium containing at least one of: Yb,Er:KYF (potassium yttrium fluoride) Yb, Ef:$YF_3$; and forming a red visible light in the display medium by particles excited by the light beam having a limit efficiency of at least approximately 7%.

*36. The method recited in claim 1 wherein a two dimensional image is projected.*

*37. The method recited in claim 1 wherein a three dimensional image is projected.*

* * * * *

UNITED STATES PATENT AND TRADEMARK OFFICE

CERTIFICATE OF CORRECTION

PATENT NO. : RE42,184 E
APPLICATION NO. : 11/805862
DATED : March 1, 2011
INVENTOR(S) : Bass et al.

It is certified that error appears in the above-identified patent and that said Letters Patent is hereby corrected as shown below:

Title page, item (57), under "Abstract", in Column 2, Line 16, delete "Yb,Er(NYF)" and insert -- Yb,Er:NYF --.

Column 1, lines 7-21, delete "This invention claims the benefit of priority to U.S. Provisional Application 60/342,578 filed Dec. 26, 2001, and this invention is a Continuation-In-Part of U.S. application Ser. No. 09/976,921 filed Oct. 12, 2001 now U.S. Pat. No. 6,501,590, which is a Divisional Application of U.S. application Ser. No. 09/448,657 filed Nov. 24, 1999, now U.S. Pat. No. 6,327,074, which claims priority to U.S. Provisional Application 60/109,837 filed by the same subject inventors and assignee as the subject invention on Nov. 25, 1998, and this invention is a Continuation-In-Part of U.S. application Ser. No. 09/919,131 filed Jul. 31, 2001 now U.S. Pat. No. 6,654,161, and U.S. application Ser. No. 09/919,130 filed Jul. 31, 2001 now U.S. Pat. No. 6,844,387, and this invention was partially funded under U.S. Army Contract DAAD199910220." and insert -- RELATED APPLICATIONS
This [invention] *is a reissue application of U.S. Application No. 10/329,920, filed December 26,2002, and issued as US 6,897,999, which* claims the benefit *under 35 U.S.C. § 119(e)* of [priority to] U.S. Provisional Application *No.* 60/342,578, filed [Dec]*December* 26, 2001, and [this invention] is a Continuation-In-Part of U.S. [a]*A*pplication [Ser.] No. 09/976,921, filed[Oct] *October* 12, 2001, [now U.S. Pat. No.] *and issued as US* 6,501,590, which is a Divisional Application of U.S. Application [Ser.]No. 09/448,657, filed [Nov.]*November* 24, 1999, [now U.S. Pat. No.] *and issued as US* 6,327,074, which claims *the benefit under 35 U.S.C. § 119(e) of* [priority to] U.S. Provisional Application *No.* 60/109,837, filed [by the same subject inventors and assignee as the subject invention on Nov.] *November* 25, 1998[,]; and *U.S. Application No. 10/329,920, filed December 26, 2002, and issued as US 6,897,999,* [this invention] is *also* a Continuation-In-Part of U.S. Application [Ser.] No. 09/919,131, filed [Jul.] *July* 31, 2001, [now U.S. Pat. No.] *and issued as US* 6,654,161, and a *Continuation-In-Part of* U.S. [a]*A*pplication [Ser.] No. 09/919,130, filed [Jul.] *July* 31, 2001, [now U.S. Pat. No.] *and issued as US* 6,844,387, *both of which are continuation-in-part applications of U.S. Application No. 09/448,657, filed November 24, 1999, now US 6,327,074, which claims the benefit under 35 U.S.C. § 119(e) of U.S. Provisional Application No. 60/109,837, filed November 25, 1998.* [and]

Signed and Sealed this
Fifth Day of July, 2011

David J. Kappos

David J. Kappos
*Director of the United States Patent and Trademark Office*

*STATEMENT REGARDING FEDERALLY SPONSORED RESEARCH OR DEVELOPMENT*
This invention was partially funded under U.S. Army Contract DAAD199910220. --.

Column 18, line 50, in Claim 4, delete "YLF(yttrium" and insert -- YLF (yttrium --.

Column 18, line 57, in Claim 6, delete "NYF(sodium" and insert -- NYF (sodium --.

Column 19, line 21, in Claim 12, delete "KYF(potassium" and insert -- KYF (potassium --.

Column 19, line 50, in Claim 19, delete "modulator(SLM)." and insert -- modulator (SLM). --.

Column 19, lines 54-55, in Claim 20, delete "system(MEMS)device." and insert -- system (MEMS) device. --.

Column 19, line 59, in Claim 21, delete "display(LCD)." and insert -- display (LCD). --.

Column 19, line 63, in Claim 22, delete "device(DMD)." and insert -- device (DMD). --.

Column 19, line 67, in Claim 23, delete "projector(DLP)." and insert -- projector (DLP). --.

Column 20, line 4, in Claim 24, delete "valve(GLV)." and insert -- valve (GLV). --.

Column 20, line 8, in Claim 25, delete "silicon(LCOS)" and insert -- silicon (LCOS) --.

Column 20, line 13, in Claim 26, delete "display(LCD)." and insert -- display (LCD). --.

Column 20, lines 17-18, in Claim 27, delete "modulator(E-beam" and insert -- modulator (E-beam --.

Column 20, lines 22-23, in Claim 28, delete "Grattings(ESBGs)" and insert -- Gratings (ESBGs) --.

Column 21, line 8, in Claim 35, delete "Yb, Ef:$YF_3$;" and insert -- Yb,Ef:$YF_3$; --.